US012579926B2

(12) United States Patent
No

(10) Patent No.: US 12,579,926 B2
(45) Date of Patent: Mar. 17, 2026

(54) DISPLAY DEVICE

(71) Applicant: Samsung Display Co., Ltd., Yongin-Si (KR)

(72) Inventor: Sang Yong No, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/427,820

(22) Filed: Jan. 31, 2024

(65) Prior Publication Data

US 2024/0395190 A1 Nov. 28, 2024

(30) Foreign Application Priority Data

May 24, 2023 (KR) ........................ 10-2023-0066739

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0426* (2013.01); *G09G 2300/0842* (2013.01); *G09G 2310/0205* (2013.01); *G09G 2310/08* (2013.01); *G09G 2320/0233* (2013.01); *G09G 2320/0247* (2013.01)

(58) Field of Classification Search
CPC ................... G09G 3/32; G09G 3/3233; G09G 2300/0426; G09G 2300/0842; G09G 2310/0205; G09G 2310/08; G09G 2320/0233; G09G 2320/0247
See application file for complete search history.

(56) References Cited

U.S. PATENT DOCUMENTS

| | | | | |
|---|---|---|---|---|
| 8,913,090 | B2 | 12/2014 | Chung et al. | |
| 11,222,604 | B2 | 1/2022 | Lee et al. | |
| 2005/0099412 | A1 | 5/2005 | Kasai | |
| 2006/0027807 | A1* | 2/2006 | Nathan | G09G 3/3241 257/E27.111 |
| 2020/0211465 | A1* | 7/2020 | Jeong | G09G 3/3258 |
| 2022/0122522 | A1* | 4/2022 | Li | G09G 3/2092 |
| 2022/0319430 | A1 | 10/2022 | Wang et al. | |

(Continued)

FOREIGN PATENT DOCUMENTS

| | | | |
|---|---|---|---|
| KR | 10-0667664 | B1 | 1/2007 |
| KR | 10-1127582 | B1 | 3/2012 |

(Continued)

*Primary Examiner* — Hong Zhou
(74) *Attorney, Agent, or Firm* — Innovation Counsel LLP

(57) ABSTRACT

Disclosed is a display device including a display panel including a light emitting element and a pixel circuit connected to the light emitting element, wherein the pixel circuit includes a first transistor including a gate electrode connected to a first node, a first electrode connected to a first power line, and a second electrode connected to a second power line, a second transistor connected between the second electrode of the first transistor and a data line to receive a write scan signal, a third transistor connected between the first node and the first electrode of the first transistor to receive a compensation scan signal, a storage capacitor connected between the first node and the second power line, and a fourth transistor connected between the storage capacitor and the second power line to receive a first emission control signal.

19 Claims, 25 Drawing Sheets

(56) References Cited

U.S. PATENT DOCUMENTS

| | | | | |
|---|---|---|---|---|
| 2022/0335872 | A1* | 10/2022 | Zhang | G09G 3/3233 |
| 2023/0169922 | A1* | 6/2023 | Watakabe | G09G 3/3233<br>345/204 |
| 2023/0215361 | A1* | 7/2023 | Ryu | G09G 3/3233<br>345/691 |
| 2023/0298522 | A1* | 9/2023 | Kobayashi | G09G 3/3233<br>345/76 |
| 2024/0038162 | A1* | 2/2024 | Yin | G09G 3/3233 |
| 2024/0169904 | A1* | 5/2024 | Liu | G09G 3/32 |
| 2024/0212580 | A1* | 6/2024 | Xu | G09G 3/32 |

FOREIGN PATENT DOCUMENTS

| | | | |
|---|---|---|---|
| KR | 10-1549900 | B1 | 9/2015 |
| KR | 10-2019-0069208 | A | 6/2019 |
| KR | 10-2020-0139297 | A | 12/2020 |

* cited by examiner

DISPLAY DEVICE

CROSS-REFERENCE TO RELATED APPLICATIONS

This application claims priority under 35 U.S.C. § 119 to Korean Patent Application No. 10-2023-0066739 filed on May 24, 2023, in the Korean Intellectual Property Office, the disclosures of which are incorporated by reference herein in their entireties.

BACKGROUND

Embodiments of the present disclosure described herein relate to a display device, and more particularly, relate to a display device with improved display quality.

A display device may be a device including various electronic components such as a display panel for displaying an image, an input sensor for detecting an external input, and an electronic module. Electronic components may be electrically connected to each other by signal lines arranged in various manners. The display panel includes a plurality of pixels. Each of the plurality of pixels includes a light emitting element that generates light and a pixel driving circuit that controls the amount of current flowing through the light emitting element. In this case, light of luminance corresponding to the amount of current flowing through the light emitting element is generated.

SUMMARY

Embodiments of the present disclosure provide a display device with improved display quality.

A display device includes a display panel including a light emitting element and a pixel circuit connected to the light emitting element, wherein the pixel circuit includes a first transistor including a gate electrode connected to a first node, a first electrode connected to a first power line, and a second electrode connected to a second power line, a second transistor connected between the second electrode of the first transistor and a data line to receive a write scan signal, a third transistor connected between the first node and the first electrode of the first transistor to receive a compensation scan signal, a storage capacitor connected between the first node and the second power line, and a fourth transistor connected between the storage capacitor and the second power line to receive a first emission control signal.

The display panel may display an image in a plurality of frames and at least one of the plurality of frames may include a first initialization interval, a compensation interval following the first initialization interval, a second initialization interval following the compensation interval, and an emission interval following the second initialization interval. The compensation scan signal may have an active level and the write scan signal and the first emission control signal may have an inactive level during the first initialization interval. The compensation scan signal may have the active level and the first emission control signal may have the inactive level during the compensation interval. The first emission control signal may have an active level, and the write scan signal and the compensation scan signal may have the inactive level during the second initialization interval. The compensation interval may include a data write interval in which the write scan signal has an active level.

The plurality of frames, and at least one of the plurality of frames may include a writing frame and a holding frame. The write scan signal and the compensation scan signal may have the active level in the write frame. The write scan signal may have the active level or the inactive level in the holding frame, and the compensation scan signal has the inactive level during the holding frame.

The pixel circuit may further include a fifth transistor connected between a second node connected to the storage capacitor and the fourth transistor and a reference voltage line.

The display panel may display an image in a plurality of frames and at least one of the plurality of frames may include a first initialization interval, a compensation interval following the first initialization interval, a second initialization interval following the compensation interval, and an emission interval following the second initialization interval. The fifth transistor may receive one of the compensation scan signal and the black scan signal, and the one of the compensation scan signal and a black scan signal received by the fifth transistor may have an active level during the first initialization interval and the compensation interval, and have an inactive level during the second initialization interval.

The pixel circuit may further include a sixth transistor connected between the second electrode of the first transistor and the second power line to receive the first emission control signal.

The pixel circuit may further include a seventh transistor connected between the first power line and the first electrode of the first transistor to receive a second emission control signal.

The second emission control signal may correspond to an i-th light emission control signal that are sequentially activated, where "i" is a natural number, and the first emission control signal may correspond to an (i−k)-th emission control signal that are sequentially activated, where "k" is a natural number less than or equal to "i".

The display panel may display an image in a plurality of frames and at least one of the plurality of frames may include a first initialization interval, a compensation interval following the first initialization interval, a second initialization interval following the compensation interval, and an emission interval following the second initialization interval. The first emission control signal may have an active level, and the second emission control signal may have an inactive level during the second initialization interval. The first emission control signal and the second emission control signal may have the active level during the emission interval.

The light emitting element may include an anode connected to a third node which is connected to the fourth transistor and the sixth transistor and a cathode connected to the second power line.

The pixel circuit may further include an eighth transistor connected between the third node and an initialization voltage line to receive a black scan signal.

The display panel may display an image in a plurality of frames and at least one of the plurality of frames may include a first initialization interval, a compensation interval following the first initialization interval, a second initialization interval following the compensation interval, and an emission interval following the second initialization interval. The black scan signal may have an active level during the first initialization interval and the compensation interval, and have an inactive level during the second initialization interval.

The compensation scan signal may have an active level during the compensation interval and an inactive level during the second initialization interval, and the black scan signal may be inactivated after the compensation scan signal is inactivated.

The display panel may display an image for a plurality of frames, and at least one of the plurality of frames may include a writing frame and a holding frame. The black scan signal may have the active level in the write frame and the holding frame.

The pixel circuit may further include a fifth transistor connected between a second node connected to the storage capacitor and the fourth transistor and a reference voltage line to receive the black scan signal.

The first transistor may further include a back-gate electrode connected to the third node which is connected to the anode of the light emitting element.

The light emitting element may include an anode connected to the first power line, and a cathode connected to the first electrode of the first transistor.

The pixel circuit may further include an eighth transistor connected between the cathode of the light emitting element and an initialization voltage line to receive a black scan signal.

The first transistor may further include a back-gate electrode connected to the second power line.

The first transistor may further include a back-gate electrode connected to a gate initialization voltage line.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
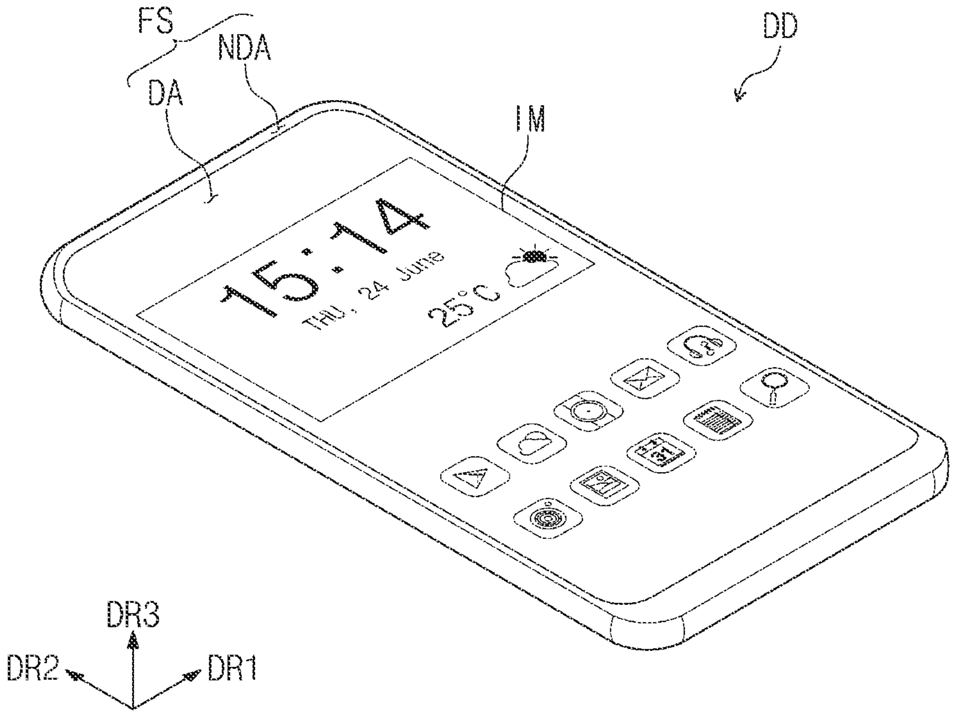
FIG. 1 is a perspective view illustrating a display device according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

The same reference numerals/signs refer to the same components. Also, in drawings, the thickness, ratio, and dimension of components are exaggerated for effectiveness of description of technical contents. The term "and/of" includes one or more combinations which associated components are capable of defining.

Although the terms "first", "second", etc. may be used to describe various components, the components should not be construed as being limited by the terms. The terms are used only to differentiate one component from another component. For example, without departing the scope of the disclosure, a first component may be referred to as a second component, and similarly, a second component may be referred to as a first component. The singular forms are intended to include the plural forms unless the context clearly indicates otherwise.

Also, the terms "under", "below", "on", "above", etc. are used to describe the correlation of components illustrated in drawings. The terms that are relative in concept are described based on a direction shown in drawings.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the present disclosure belongs. In addition, the terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a perspective view of a display device DD according to an embodiment of the present disclosure.

Referring to FIG. 1, the display device DD may have a shape having a short side in a first direction DR1 and a long side in a second direction DR2 intersecting the first direction DR1. However, the shape of the display device DD is not limited thereto. For example, the display device DD may be implemented in various shapes.

According to an embodiment of the present disclosure, the display device DD may be a small and medium-sized electronic device such as a mobile phone, a tablet PC, a vehicle navigation system, a game console, or the like as well as a large-sized electronic device such as a television, a monitor, or the like. These are just presented as embodiments. It is obvious that these are capable of being employed in other display devices as long as these do not depart from the concept of the present disclosure.

As illustrated in FIG. 1, the display device DD may display an image IM on a display surface FS parallel to each of the first direction DR1 and the second direction DR2, so as to face a third direction DR3 intersecting the first direction DR1 and the second direction DR2. The display surface FS on which the image IM is displayed may correspond to a front surface of the display device DD.

The display surface FS of the display device DD may include a plurality of areas. A display area DA and a non-display area NDA may be defined in the display surface FS of the display device DD.

The display area DA may be an area where the image IM is displayed, and the user may perceive the image IM through the display area DA. A shape of the display area DA may be defined substantially by the non-display area NDA. However, this is illustrated as an example. The non-display area NDA may be disposed adjacent to only one side of the display area DA or may be omitted. The display device DD according to an embodiment of the present disclosure may include various embodiments and is not limited to any one embodiment.

The non-display area NDA may be disposed adjacent to the display area DA and may be an area in which the image IM is not displayed. A bezel area of the display device DD may be defined by the non-display area NDA.

The non-display area NDA may surround the display area DA. However, this is illustrated as an example, and the non-display area NDA may be disposed adjacent to only a portion of edges of the display area DA, and the configuration of the non-display area NDA is not limited to any one embodiment.

Figure 2:
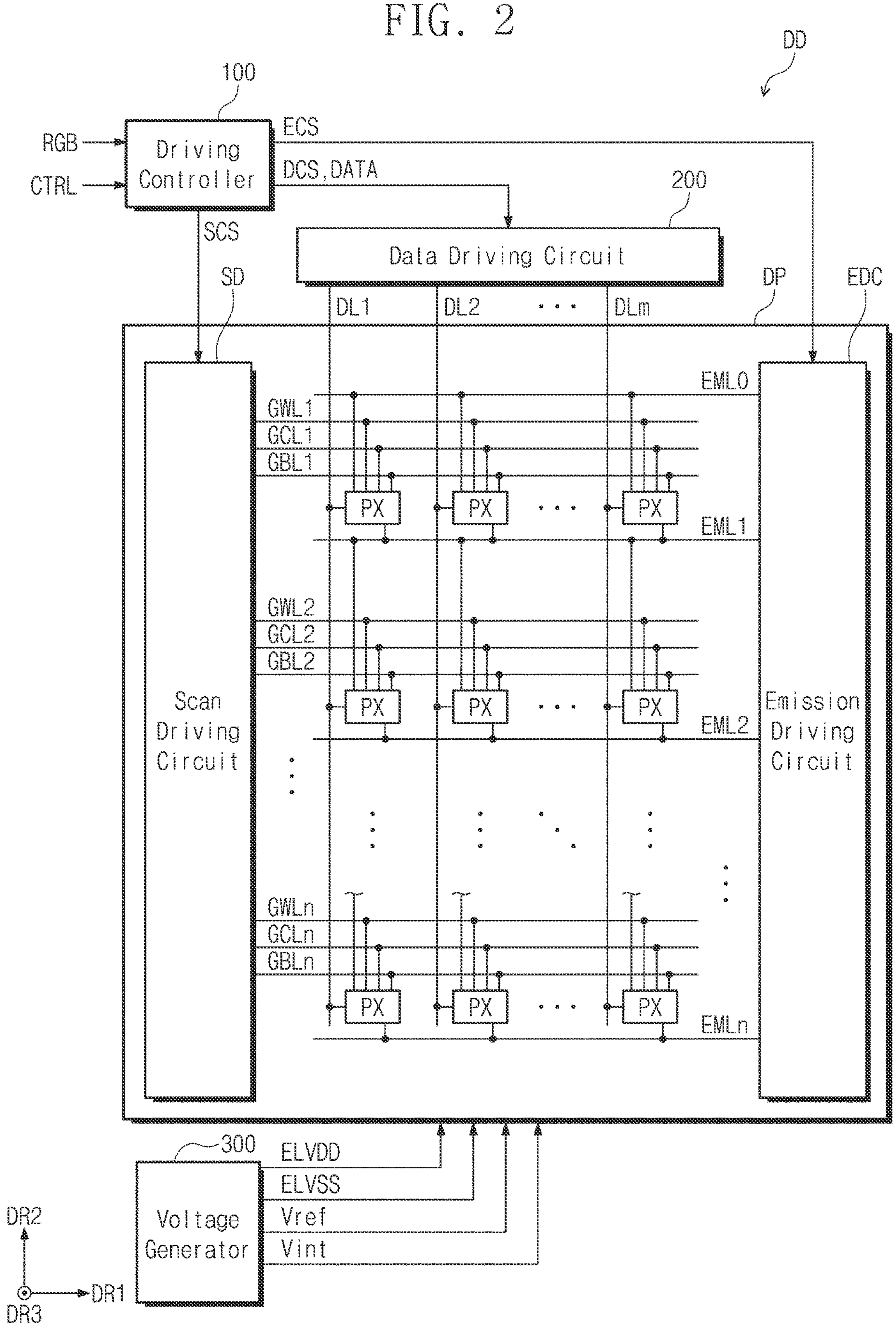
FIG. 2 is a block diagram of a display device, according to an embodiment of the present disclosure.

FIG. 2 is a block diagram of the display device DD according to an embodiment of the present disclosure.

Referring to FIG. 2, the display device DD may include a display panel DP, a driving controller 100, a data driving circuit 200, and a voltage generator 300.

The display panel DP according to an embodiment of the present disclosure may be a light emitting display panel, but the configuration of the display panel DP is not particularly limited thereto. For example, the display panel DP may be an organic light emitting display panel, a quantum dot light emitting display panel, a micro LED display panel, or a nano LED display panel. An emission layer of the organic light-emitting display layer may include an organic light-emitting material. An emission layer of the quantum dot light-emitting display panel may include a quantum dot, a quantum rod, etc. An emission layer of the micro LED display panel may include a micro LED. An emission layer of the nano-LED display panel may include a nano-LED.

The driving controller 100 may receive an image signal RGB and a control signal CTRL. The driving controller 100 may generate an image data signal DATA by converting a data format of the image signal RGB so as to be suitable for the interface specification of the data driving circuit 200. The driving controller 100 may output a scan control signal SCS, a data control signal DCS, and an emission driving control signal ECS.

The data driving circuit 200 may receive the data control signal DCS and the image data signal DATA from the driving controller 100. The data driving circuit 200 may convert the image data signal DATA into data voltages Vdata (see FIG. 4) and supply the data voltages Vdata (see FIG. 4) to a plurality of data lines DL1 to DLm, respectively. The data voltages Vdata (see FIG. 4) may be analog voltages corresponding to grayscale values of the image data signal DATA.

In an embodiment of the present disclosure, the data driving circuit 200 may output data voltages Vdata (see FIG. 4) corresponding to the image data signal DATA to the data lines DL1 to DLm during a driving period of one frame.

The voltage generator 300 may generate voltages required for operation of the display panel DP. In an embodiment of the present disclosure, the voltage generator 300 may generate a first driving voltage ELVDD, a second driving voltage ELVSS, a reference voltage Vref, and an initialization voltage Vint.

The display panel DP may include scan lines GWL1 to GWLn, GCL1 to GCLn, and GBL1 to GBLn, emission control lines EML0 to EMLn, the data lines DL1 to DLm, and pixels PX. The display panel DP may further include a scan driving circuit SD and an emission driving circuit EDC.

The scan driving circuit SD may be disposed on a first side of the display panel DP. The scan lines GWL1 to GWLn, GCL1 to GCLn, and GBL1 to GBLn may extend from the scan driving circuit SD in the first direction DR1.

The emission driving circuit EDC may be disposed on a second side of the display panel DP. The emission control lines EML0 to EMLn may extend from the emission driving circuit EDC in a direction opposite to the first direction DR1.

The scan lines GWL1 to GWLn, GCL1 to GCLn, and GBL1 to GBLn and the emission control lines EML0 to EMLn may be spaced apart from each other in the second direction DR2.

The scan lines GWL1 to GWLn, GCL1 to GCLn, and GBL1 to GBLn may include the write scan lines GWL1 to GWLn, the compensation scan lines GCL1 to GCLn, and the black scan lines GBL1 to GBLn.

The data lines DL1 to DLm may extend from the data driving circuit 200 in a direction opposite to the second direction DR2. The data lines DL1 to DLm may be spaced apart from each other in the first direction DR1.

In an example illustrated in FIG. 2, the scan driving circuit SD and the emission driving circuit EDC are arranged to face each other with the pixels PX interposed therebetween. However, the present disclosure is not limited thereto. For example, the scan driving circuit SD and the emission driving circuit EDC may be disposed adjacent to each other on one of the first side and the second side of the display panel DP. In an embodiment, the scan driving circuit SD and the emission driving circuit EDC may be implemented with one circuit.

The plurality of pixels PX may be electrically connected to the scan lines GWL1 to GWLn, GCL1 to GCLn, and GBL1 to GBLn, the emission control lines EML0 to EMLn, and the data lines DL1 to DLm, respectively.

Each of the plurality of pixels PX may be electrically connected with three scan lines and two emission control lines. For example, as shown in FIG. 2, the write scan lines GWL1 to GWLn may include first to n-th write scan lines GWL1 to GWLn, the compensation scan lines GCL1 to GCLn may include first to n-th compensation scan lines GCL1 to GCLn, the black scan lines GBL1 to GBLn may include first to n-th black scan lines GBL1 to GBLn, and the emission control lines EML0 to EMLn may include a dummy emission control line EML0 and first to n-th emission control lines EML1 to EMLn. The pixels in the first row may be connected to the first write scan line GWL1, the first compensation scan line GCL1, the first black scan line GBL1, the dummy emission control line EML0, and the first emission control line EML1. Also, the pixels in the second row may be connected to the second write scan line GWL2, the second compensation scan line GCL2, the second black scan line GBL2, the first emission control line EML1, and the second emission control line EML2.

However, the number of scan lines and the number of emission control lines connected to each pixel are not limited thereto and may be variable.

Figure 4:
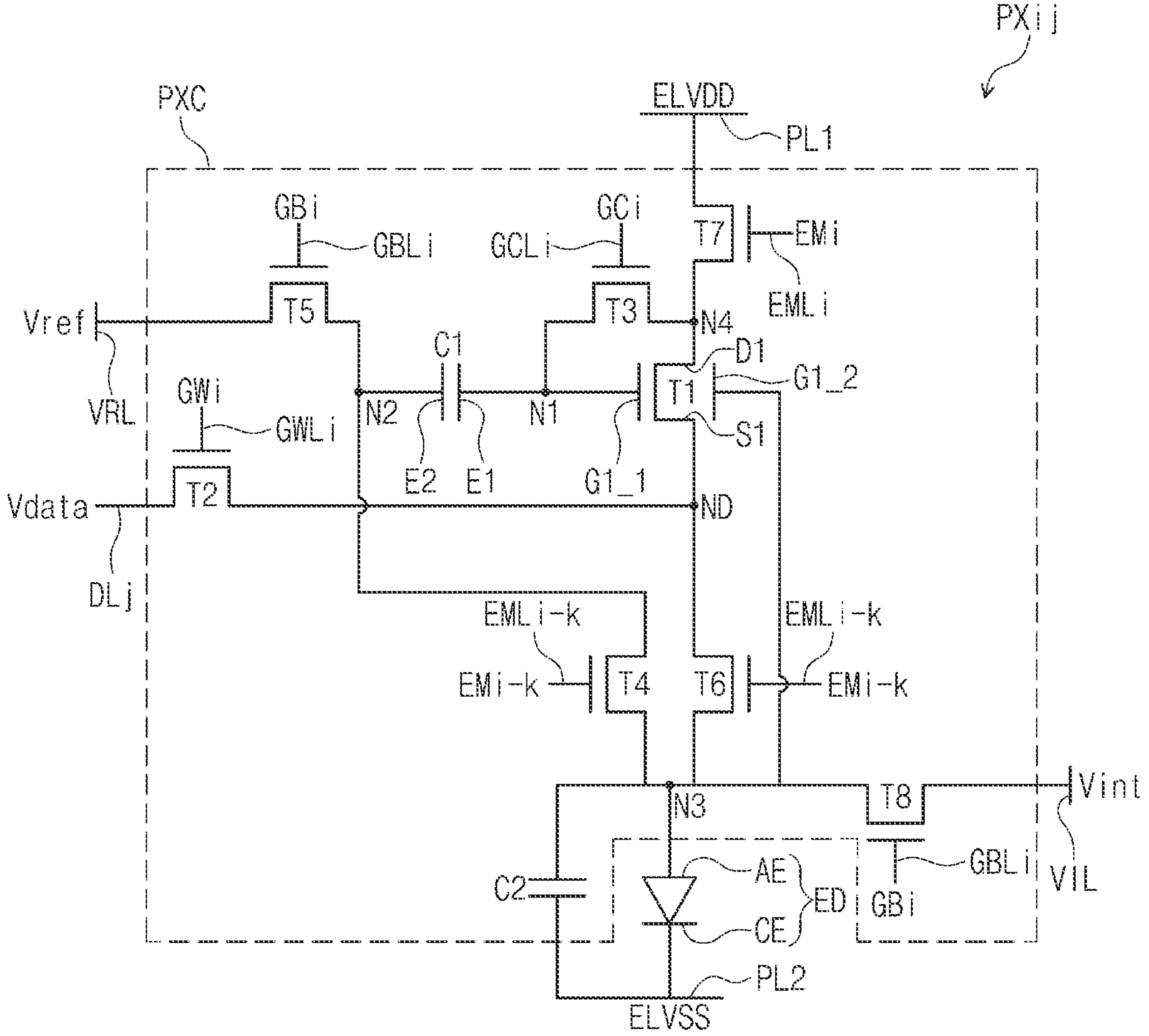
FIG. 4 is an equivalent circuit diagram of a pixel, according to an embodiment of the present disclosure.

Each of the plurality of pixels PX may include a light emitting element ED (see FIG. 4) and a pixel circuit unit PXC (see FIG. 4) that controls light emission of the light emitting element ED (see FIG. 4).

The light emitting element ED (see FIG. 4) of each of the plurality of pixels PX may generate light of different colors. For example, the plurality of pixels PX may include red pixels generating red color light, green pixels generating green color light, and blue pixels generating blue color light. A light emitting element of a red pixel, a light emitting element of a green pixel, and a light emitting element of a blue pixel may include emission layers of different materials.

The pixel circuit unit PXC (see FIG. 4) may include at least one transistor and at least one capacitor. This will be described later. The scan driving circuit SD and the emission driving circuit EDC may include transistors formed through processes for forming the pixel circuit unit PXC (see FIG. 4).

Each of the plurality of pixels PX may receive the first driving voltage ELVDD, the second driving voltage ELVSS, the reference voltage Vref, and the initialization voltage Vint from the voltage generator 300.

The scan driving circuit SD may receive the scan control signal SCS from the driving controller 100. The scan driving circuit SD may output scan signals to the scan lines GWL1 to GWLn, GCL1 to GCLn, and GBL1 to GBLn in response to the scan control signal SCS.

The emission driving circuit EDC may output emission control signals to the emission control lines EML0 to EMLn in response to the emission driving control signal ECS from the driving controller 100.

The driving controller 100 according to an embodiment of the present disclosure may determine a driving frequency and control the data driving circuit 200, the scan driving circuit SD, and the emission driving circuit EDC according to the determined driving frequency.

Figure 3A:
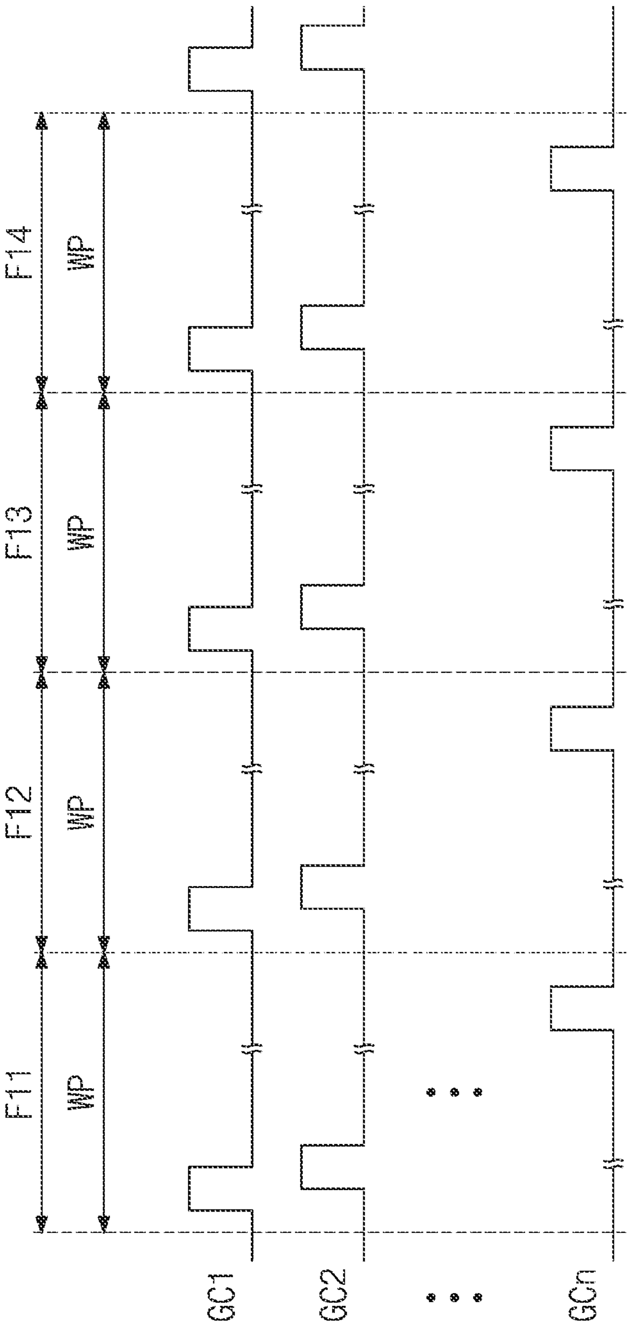
FIGS. 3A and 3B are timing diagrams for describing an operation of a display device according to an embodiment of present disclosure.
Figure 3B:
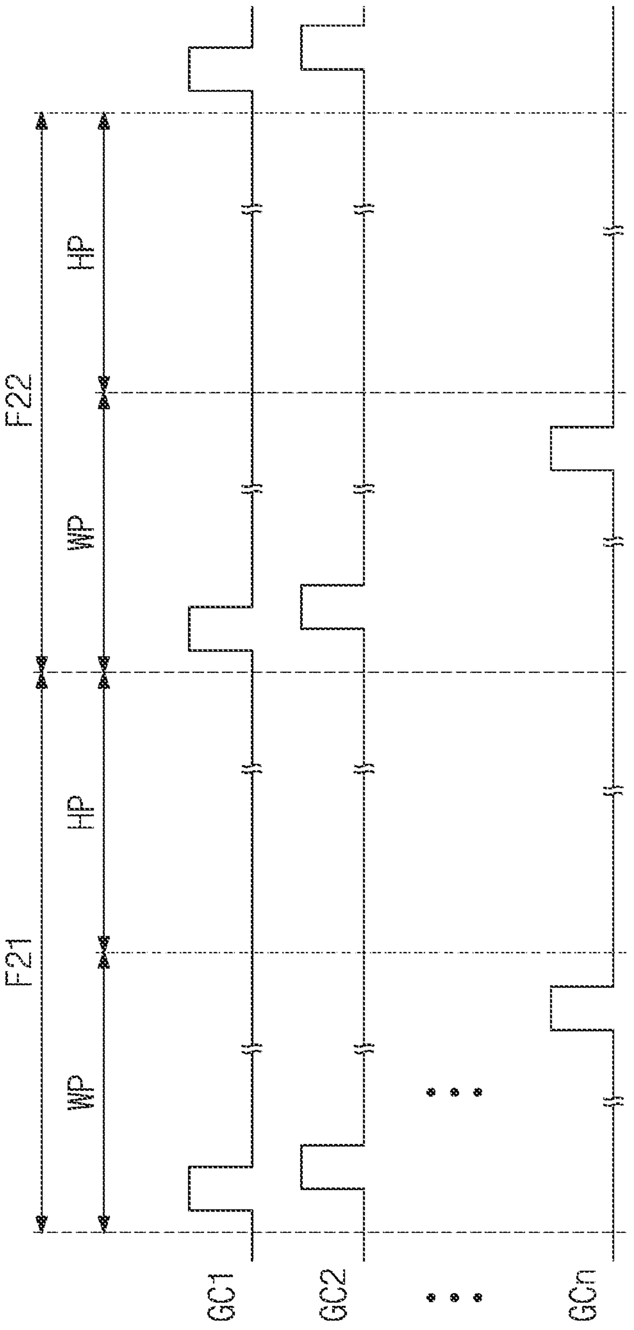

FIGS. 3A and 3B are timing diagrams for describing an operation of a display device DD (see FIG. 2) according to an embodiment of the present disclosure. FIG. 3A is a timing diagram for describing a case in which the display device DD (see FIG. 2) according to an embodiment of the present disclosure operates at a first driving frequency. FIG. 3B is a timing diagram for describing a case in which the display device DD (see FIG. 2) according to an embodiment of the present disclosure operates at a second driving frequency.

Referring to FIGS. 2 to 3B, an operating frequency of the display device DD may be changed in various manners. In an embodiment of the present disclosure, the first driving frequency may be the highest operating frequency at which the display device DD is capable of operating. The first driving frequency may be referred to as a "reference frequency" or "maximum frequency".

When the display device DD operates at the first driving frequency, the scan driving circuit SD may sequentially activate scan signals (e.g., compensation scan signals GC1 to GCn) in each of the plurality of frames F11, F12, F13, and F14 to a high level. Although only the compensation scan signals GC1 to GCn are shown in FIGS. 3A and 3B for convenience of description, according to an embodiment of the present disclosure, the write scan signals GW1 to GWn may be also activated in a similar manner according to the driving frequency.

When the first driving frequency is the maximum frequency, each of the frames F11, F12, F13, and F14 may include only a write frame WP. In this case, the duration of the write frame WP may be the same as the duration of each of the frames F11, F12, F13, and F14.

The display device DD may operate at the second driving frequency lower than the first driving frequency. When the display device DD operates at the second driving frequency lower than the first driving frequency, the duration of each of the frames F21 and F22 may be increased compared to the duration of each of the frames F11, F12, F13, and F14 shown in FIG. 3A. FIG. 3B shows, as an example, a case where the duration of each of the frames F21 and F22 operating at the second driving frequency is twice the duration of each of the frames F11, F12, F13, and F14. However, the duration of each of the frames F21 and F22 operating at the second driving frequency is not limited to any one embodiment.

Each of the frames F21 and F22 may include the write frame WP and a holding frame HP. FIG. 3B shows, as an example, a case where the write frame WP has the same duration as each of the frames F11, F12, F13, and F14 shown in FIG. 3A.

The scan driving circuit SD may sequentially activate the compensation scan signals GC1 to GCn to an active level (e.g., a high level) during the write frame WP. Although not shown in FIG. 3B, the scan driving circuit SD and the emission driving circuit EDC may sequentially activate scan signals and emission control signals to an active level (e.g., high level) during the write frame WP. The scan driving circuit SD may hold the compensation scan signals GC1 to GCn at an inactive level (e.g., a low level) during the holding frame HP. A detailed description thereof will be given later.

FIG. 4 is an equivalent circuit diagram of a pixel PXij according to an embodiment of the present disclosure.

The pixel PXij that is connected to the i-th write scan line GWLi of the write scan lines GWL1 to GWLn (see FIG. 2) and is connected to the j-th data line DLj of the plurality of data lines DL1 to DLm (see FIG. 2) is representatively illustrated in FIG. 4. The pixel PXij may be connected to the i-th compensation scan line GCLi of the compensation scan lines GCL1 to GCLn (see FIG. 2) and the i-th black scan line GBLi of the black scan lines GBL1 to GBLn (see FIG. 2). Also, the pixel PXij may be connected to the (i−k)-th emission control line EMLi−k and the i-th emission control line EMLi among the emission control lines EML0 to EMLn. Here, "i" and "j" are natural numbers, and "k" is a natural number less than or equal to "i". When "k" is equal to "i", it can be considered to be connected to the dummy emission control line EML0 described above with reference to FIG. 2. FIG. 2 shows that "k" is 1 as an example.

The pixel PXij may include the pixel circuit PXC (or a pixel driving circuit) and the light emitting element ED electrically connected to the pixel circuit PXC. In the present embodiment, the pixel circuit PXC may include eight transistors (hereinafter, referred to as first to eighth transistors T1 to T8) and two capacitors (hereinafter, referred to as first capacitor and second capacitor C1 and C2). In an embodiment of the present disclosure, the pixel PXij may not include at least one of the first to eighth transistors T1 to T8 or may further include an additional transistor. However, in an embodiment of the present disclosure, the second capacitor C2 may be omitted.

The i-th write scan line GWLi may transfer an i-th write scan signal GWi to the pixel PXij, the i-th compensation scan line GCLi may transfer an i-th compensation scan signal GCi to the pixel PXij, and the i-th black scan line GBLi may transfer an i-th black scan signal GBi to the pixel PXij. The (i−k)-th emission control line EMLi−k may transfer an (i−k)-th emission control signal EMi−k (or referred to as a first emission control signal) to the pixel PXij, and the i-th emission control line EMLi may transfer an i-th emission control signal EMii (or referred to as a second emission control signal) to the pixel PXij. The j-th data line DLj may transfer the data voltage Vdata to the pixel PXij. The data voltage Vdata may have a voltage level corresponding to a grayscale value of the image data signal DATA (see FIG. 2) output from the driving controller 100 (see FIG. 2).

Also, the pixel PXij may be connected to a first power line PL1 for receiving the first driving voltage ELVDD, a second power line PL2 for receiving the second driving voltage ELVSS, a reference voltage line VRL for receiving the reference voltage Vref, and an initialization voltage line VIL for receiving an initialization voltage Vint. The first driving voltage ELVDD may have a higher voltage level than the second driving voltage ELVSS. The reference voltage Vref may have a voltage level lower than the first driving voltage ELVDD and higher than the second driving voltage ELVSS. The initialization voltage Vint may have a voltage level lower than the first driving voltage ELVDD and higher than the second driving voltage ELVSS.

In the present embodiment, each of the first to eighth transistors T1 to T8 may be an N-type thin film transistor having an oxide semiconductor as a semiconductor layer.

The light emitting element ED may include an anode AE and a cathode CE. When the light emitting element ED is an organic light emitting element, the light emitting element ED may further include an organic layer disposed between the anode AE and the cathode CE. In the present embodiment, the cathode CE of the light emitting element ED may be connected to the second power line PL2. In the present embodiment, the cathode CE of the light emitting element ED may be directly connected to the second power line PL2. The anode AE of the light emitting element ED may be connected to the pixel circuit PXC. The light emitting element ED may emit light in response to the amount of current flowing through the first transistor T1 of the pixel circuit PXC.

The first transistor T1 may be connected between the first power line PL1 for receiving the first driving voltage ELVDD and the second power line PL2 for receiving the second driving voltage ELVSS. The first transistor T1 may be referred to as a "driving transistor". The first transistor T1 may include a first electrode D1, a second electrode S1, and a gate electrode G1_1. The gate electrode G1_1 may be connected to a first node N1, the first electrode D1 may be connected to the first power line PL1, and the second electrode S1 may be connected to the second power line PL2. The first electrode D1 may be referred to as a drain of the first transistor T1, and the second electrode S1 may be referred to as a source of the first transistor T1. The first transistor T1 may operate according to the potential of the first node N1.

According to the present embodiment, the first transistor T1 may be an N-type thin film transistor, and, through this, variation in device characteristics due to previous data may be reduced compared to a case where a P-type thin film transistor is used. Accordingly, characteristics of overcoming instantaneous afterimage may be improved.

The first electrode D1 of the first transistor T1 may be connected to the first power line PL1 via the seventh transistor T7, and the second electrode S1 of the first transistor T1 may be connected to the second power line PL2 via the sixth transistor T6. In the present embodiment, the second electrode S1 of the first transistor T1 may be connected to the anode AE of the light emitting element ED via the sixth transistor T6.

In the present embodiment, the first transistor T1 may further include a back-gate electrode G1_2. The back-gate electrode G1_2 according to the present embodiment may be connected to the anode AE of the light emitting element ED. A detailed description of the back-gate electrode G1_2 will be given later.

The second transistor T2 may be connected between the j-th data line DLj and the second electrode S1 of the first transistor T1 to receive the i-th write scan signal GWi. The second transistor T2 may be referred to as a "switching transistor". The second transistor T2 may include a first electrode connected to the j-th data line DLj, a second electrode connected to the second electrode S1 of the first transistor T1, and a gate electrode connected to the i-th write scan line GWLi. The second transistor T2 may transfer the data voltage Vdata received through the j-th data line DLj in response to the i-th write scan signal GWi received through the i-th write scan line GWLi to the second electrode S1 of the first transistor T1 and a write node ND connected to the second transistor T2.

The first capacitor C1 may be connected between the first node N1 and the second power line PL2. The first capacitor C1 may be referred to as a storage capacitor. In the present embodiment, the first capacitor C1 may include a first capacitor electrode EL connected to the first node N1 (that is, the gate electrode G1_1 of the first transistor T1) and a second capacitor electrode E2 connected to the anode AE of the light emitting element ED. The second capacitor electrode E2 of the first capacitor C1 may be connected to the anode AE of the light emitting element ED via the fourth transistor T4.

The third transistor T3 may be connected between the first node N1 (that is, the gate electrode G1_1 of the first transistor T1) and the first electrode D1 of the first transistor T1 to receive the i-th compensation scan signal GCi. The third transistor T3 may include a first electrode connected to the first electrode D1 of the first transistor T1, a second electrode connected to the first node N1, and a gate electrode connected to the i-th compensation scan line GCLi. The third transistor T3 may be turned on in response to the i-th compensation scan signal GCi received through the i-th compensation scan line GCLi to electrically connect the gate electrode G1_1 of the first transistor T1 and the first electrode D1 of the first transistor T1.

The fourth transistor T4 may be connected between a second node N2 connected to the second capacitor electrode E2 of the first capacitor C1 and the second power line PL2 to receive the (i−k)-th emission control signal EMi−k. In the present embodiment, the fourth transistor T4 may be connected between the second node N2 and the anode AE of the light emitting element ED. The fourth transistor T4 may include a first electrode connected to the anode AE of the light emitting element ED, a second electrode connected to the second node N2, and a gate electrode connected to the (i−k)-th emission control line EMLi−k. The fourth transistor T4 may be turned on in response to the (i−k)-th emission control signal EMi−k received through the (i−k)-th emission control line EMLi−k to electically connect the second node N2 and a third node N3. In the present embodiment, the third node N3 may correspond to a node connected to the second electrode of the fourth transistor T4 and the anode AE the light emitting element ED.

The fifth transistor T5 may be connected between the reference voltage line VRL and the second node N2 (that is, the second capacitor electrode E2 of the first capacitor C1) to receive the i-th black scan signal GBi. The fifth transistor T5 may include a first electrode connected to the reference voltage line VRL, a second electrode connected to the second node N2, and a gate electrode connected to the i-th black scan line GBLi. The fifth transistor T5 may be turned on in response to the i-th black scan signal GBi received through the i-th black scan line GBLi to provide the reference voltage Vref to the second capacitor electrode E2 of the first capacitor C1.

The sixth transistor T6 may be connected between the write node ND (that is, the second electrode S1 of the first transistor T1) and the second power line PL2 to receive the (i−k)-th emission control signal EMi−k. In the present embodiment, the sixth transistor T6 may be connected between the write node ND and the anode AE of the light emitting element ED. The sixth transistor T6 may include a first electrode connected to the write node ND, a second electrode connected to the third node N3, and a gate electrode connected to the (i−k)-th emission control line EMLi−k. The sixth transistor T6 may be turned on in response to the (i−k)-th emission control signal EMi−k received through the (i−k)-th emission control line EMLi−k to electrically connect the second electrode S1 of the first transistor T1 and the third node N3.

According to the present embodiment, the fourth transistor T4 and the sixth transistor T6 are simultaneously turned on in response to the (i−k)-th emission control signal EMi−k to electrically connect the second capacitor electrode E2 of the first capacitor C1 and the second electrode S1 of the first transistor T1.

According to the present embodiment, the fourth transistor T4 and the sixth transistor T6 may be connected to the (i−k)-th emission control line EMLi−k to receive the (i−k)-th emission control signal EMi−k, so that the fourth transistor T4 and the sixth transistor T6 may be turned on through a signal from a previous stage even though they are not connected to a separate scan line that outputs a separate scan signal. That is, a separate scan line for turning on the fifth transistor T4 and the sixth transistor T6 may be omitted. Through this, the area of the non-display area NDA (see FIG. 1) may be reduced and a distance between wires connected to the pixel Pxij may be increased, thus reducing signal interference between wires.

The seventh transistor T7 may be connected between the first power line PL1 and a fourth node N4 to receive the i-th emission control signal EMi. The fourth node N4 may correspond to a node connected to the first electrode D1 of the first transistor T1 and the third transistor T3. In the present embodiment, the seventh transistor T7 may be directly connected to the first power line PL1. The seventh transistor T7 may include a first electrode connected to the first power line PL1, a second electrode connected to the fourth node N4 and a gate electrode connected to the i-th emission control line EMLi. The seventh transistor T7 may be turned on in response to the i-th emission control signal EMi to electrically connect the first power line PL1 to the first electrode D1 of the first transistor T1.

The eighth transistor T8 may be connected between the initialization voltage line VIL and the third node N3 to receive the i-th black scan signal GBi. In this embodiment, the eighth transistor T8 may be connected between the initialization voltage line VIL and the anode AE of the light emitting element ED. The eighth transistor T8 may include a first electrode connected to the initialization voltage line VIL, a second electrode connected to the third node N3, and a gate electrode connected to the i-th black scan line GBLi. The eighth transistor T8 may be turned on in response to the i-th black scan signal GBi received through the i-th black scan line GBLi to provide the initialization voltage Vint to the anode AE of the light emitting element ED.

According to the present embodiment, the fifth transistor T5 and the eighth transistor T8 may receive the same scan signal. Accordingly, even though a separate scan line outputting a separate scan signal is not connected to the fifth transistor T5, the fifth transistor T5 may be turned on through the i-th black scan signal GBi for controlling the eighth transistor T8. That is, a separate scan line for turning on the fifth transistor T5 may be omitted. Through this, the area of the non-display area NDA (see FIG. 1) may be reduced and a distance between wires connected to the pixel PXij may be increased, thus reducing signal interference between wires.

According to the present embodiment, the back-gate electrode G1_2 of the first transistor T1 may be connected to the third node N3 (that is, the second electrode of the eighth transistor T8). Accordingly, the eighth transistor T8 may be turned on in response to the i-th black scan signal GBi to provide the initialization voltage Vint to the back-gate electrode G1_2 of the first transistor T1.

The second capacitor C2 may be connected between the anode AE of the light emitting element ED and the cathode CE of the light emitting element ED. In the present embodiment, the second capacitor C2 may be connected between the third node N3 and the second power line PL2.

Figure 5:
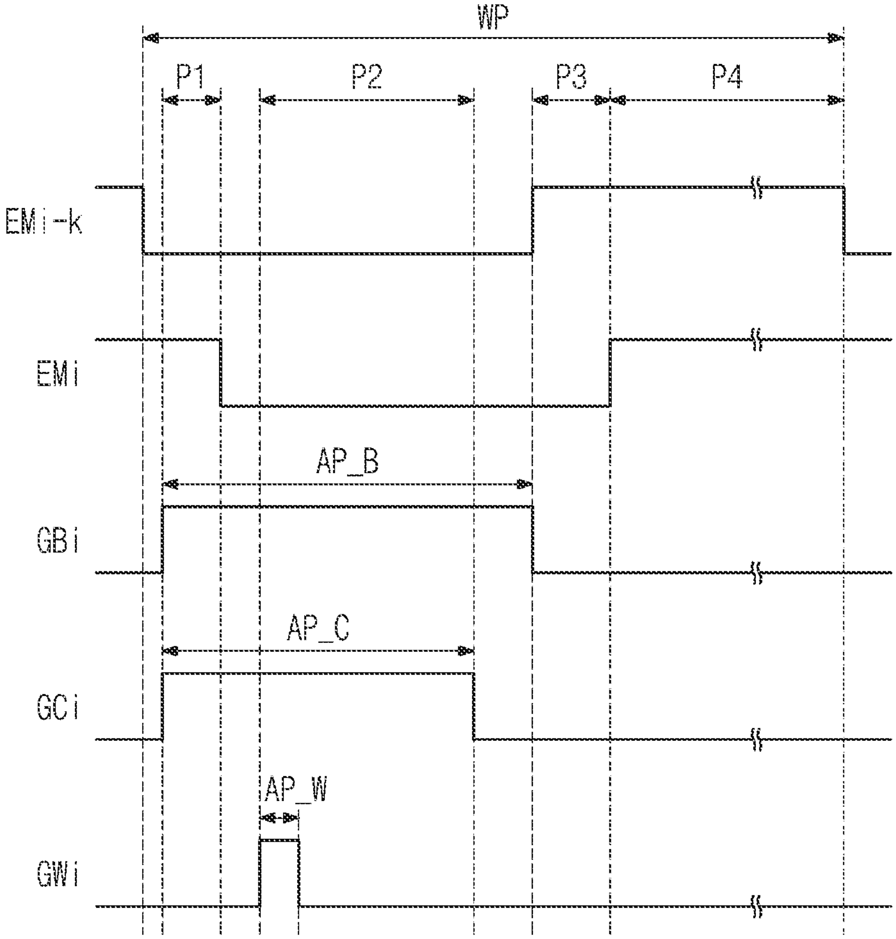
FIG. 5 is a timing diagram for describing an operation of a pixel of FIG. 4 according to an embodiment of the present disclosure.

FIG. 5 is a timing diagram for describing an operation of the pixel PXij of FIG. 4 according to an embodiment of the present disclosure. FIGS. 6A to 6E are diagrams for describing the pixel PXij according to an embodiment of the present disclosure. Hereinafter, an operation of the pixel PXij will be described in detail with reference to FIGS. 4 to 6E.

The display device DD (see FIG. 2) may display an image every frame. The write scan lines GWL1 to GWLn (see FIG. 2), the black scan lines GBL1 to GBLn (see FIG. 2), the compensation scan lines GCL1 to GCLn (see FIG. 2), and the emission control lines EML0 to EMLn (see FIG. 2) may receive scan signals or emission control signals during a frame, respectively. FIG. 5 shows, as an example, an operation of the pixel PXij during the write frame WP in any one of the frames F11 to F14 shown in FIG. 3A and the write frame WP in the frames F21 and F22 shown in FIG. 3B.

The write frame WP may include a first interval P1 (or first initialization interval), a second interval P2 (or compensation interval), a third interval P3 (or second initialization interval), and a fourth interval P4 (or emission interval). In this embodiment, the first interval P1 (that is, the first initialization interval) may precede the second interval P2 (that is, the compensation interval), and the third interval P3 (that is, the second initialization interval) may follow the second interval P2 (that is, the compensation interval).

Figure 6A:
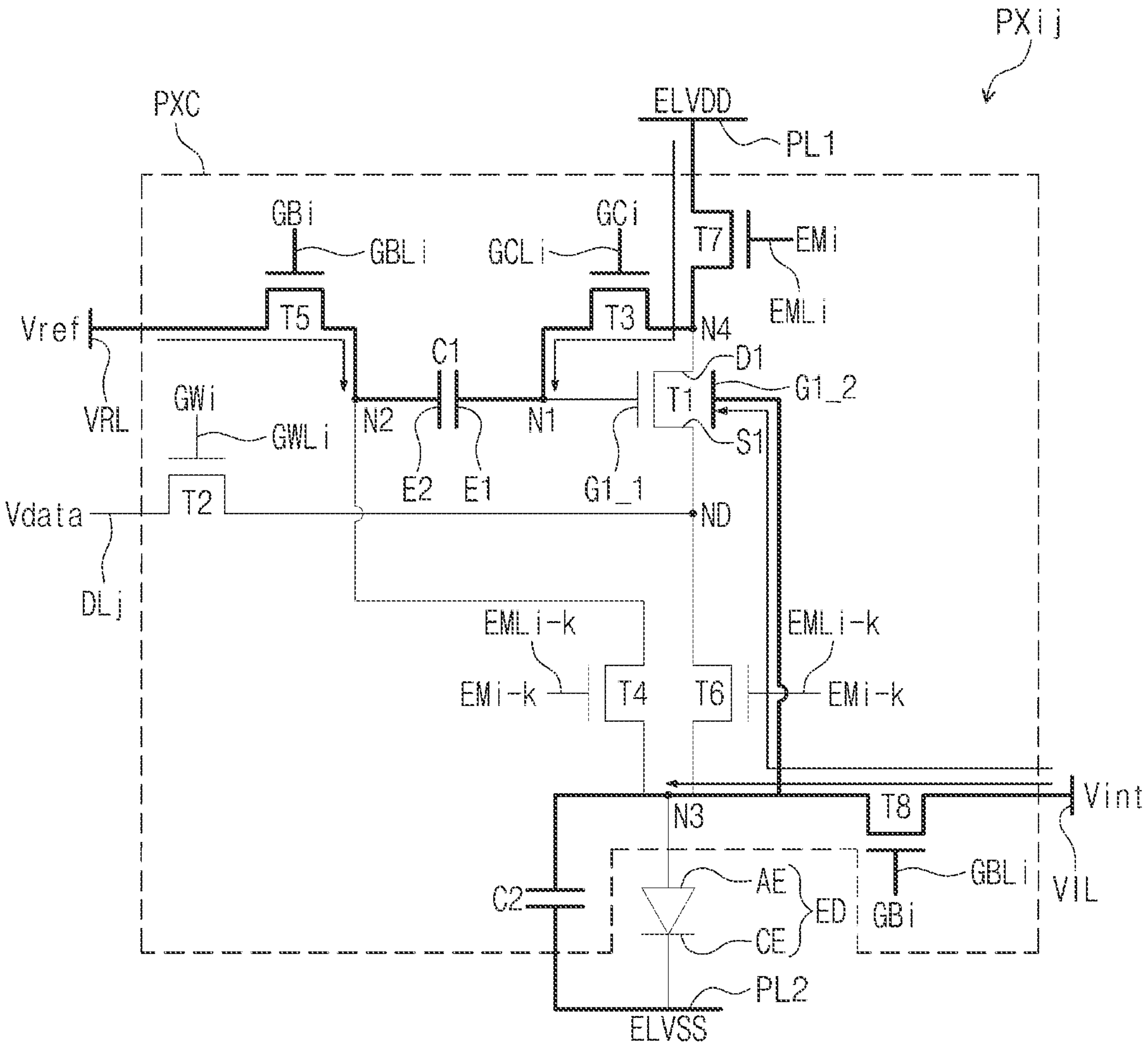
FIGS. 6A, 6B, 6C, 6D and 6E are diagrams for describing an operation of a pixel according to an embodiment of the present disclosure.
Figure 6B:
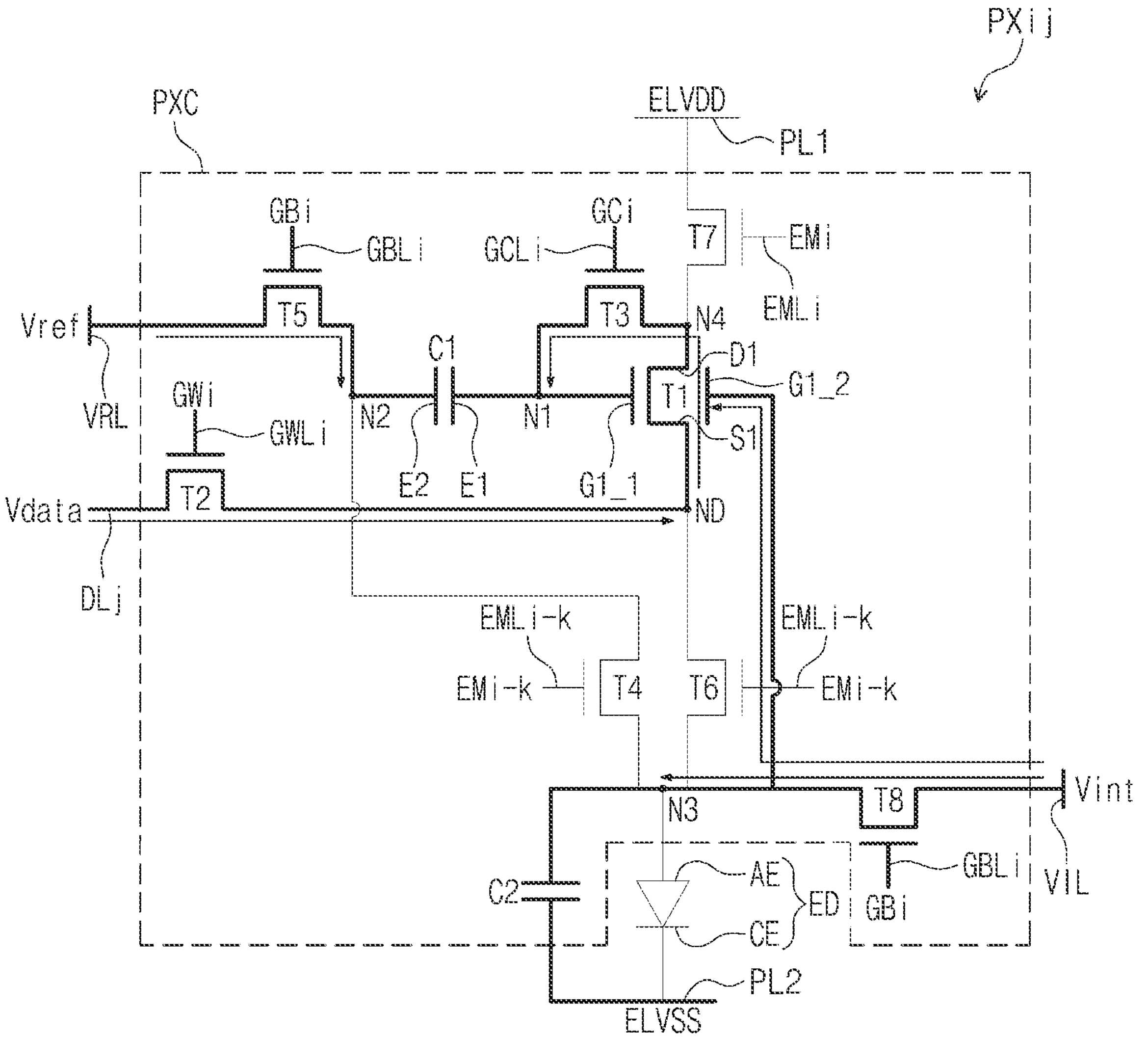
Figure 6C:
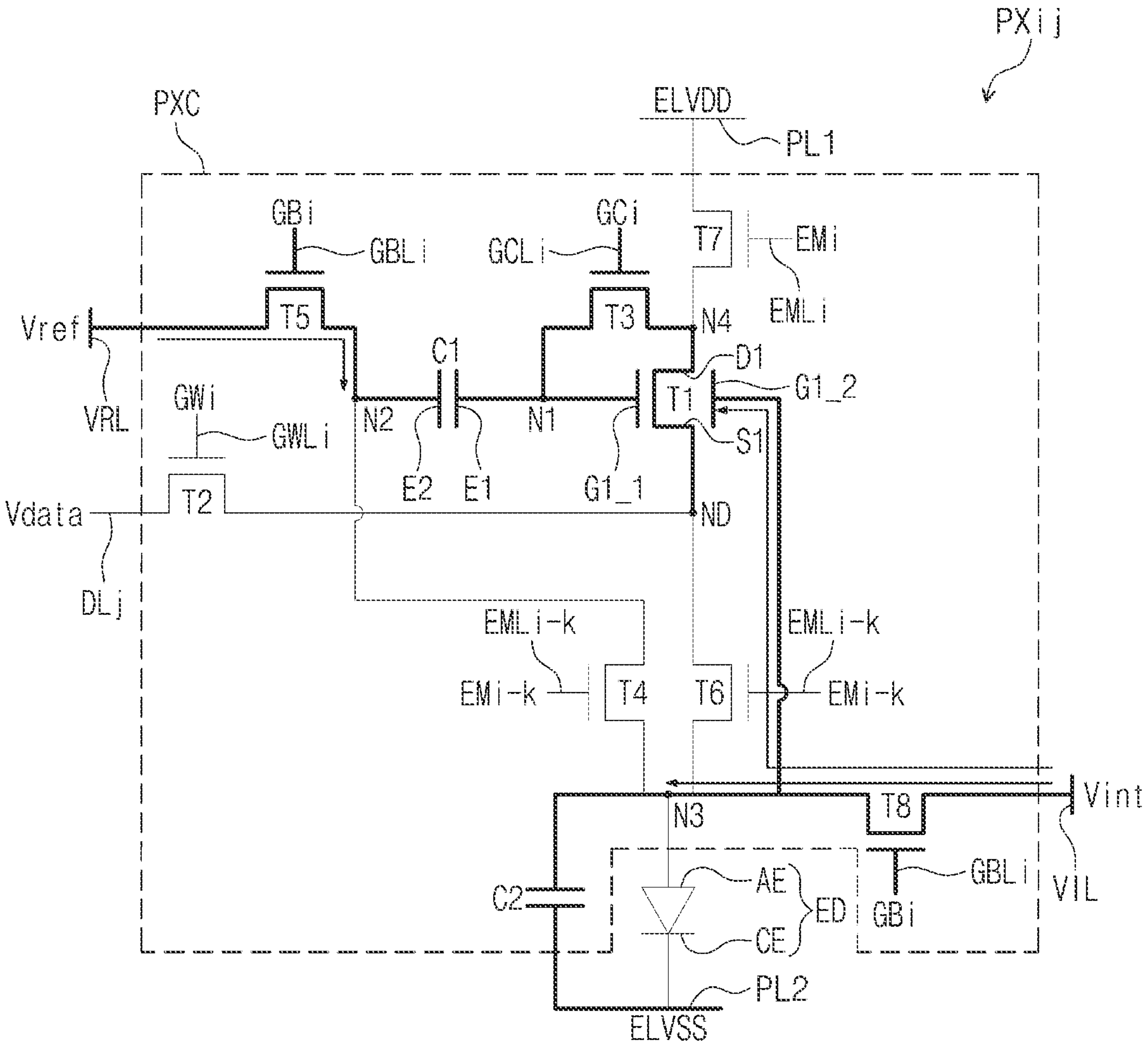
Figure 6D:
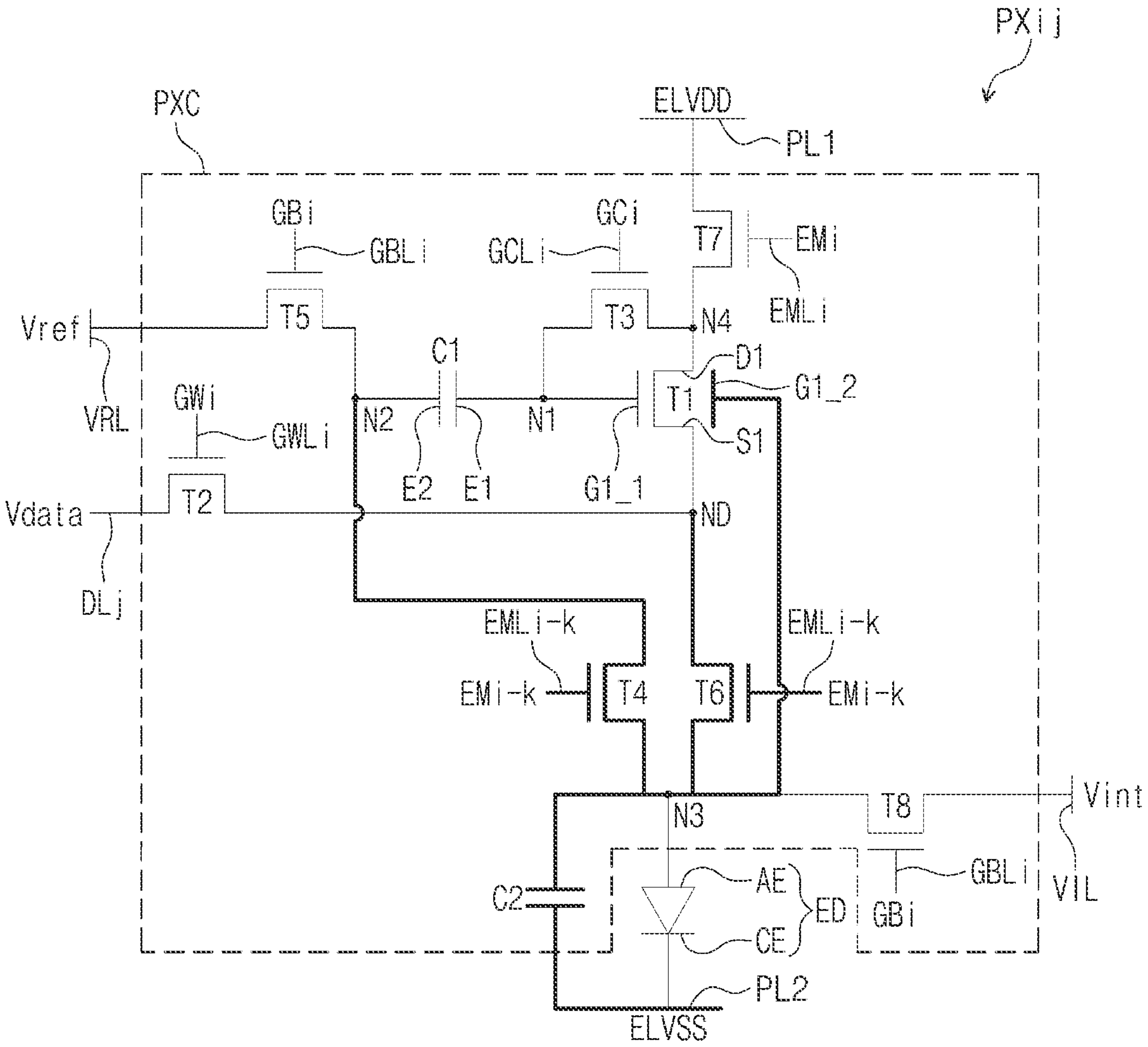
Figure 6E:
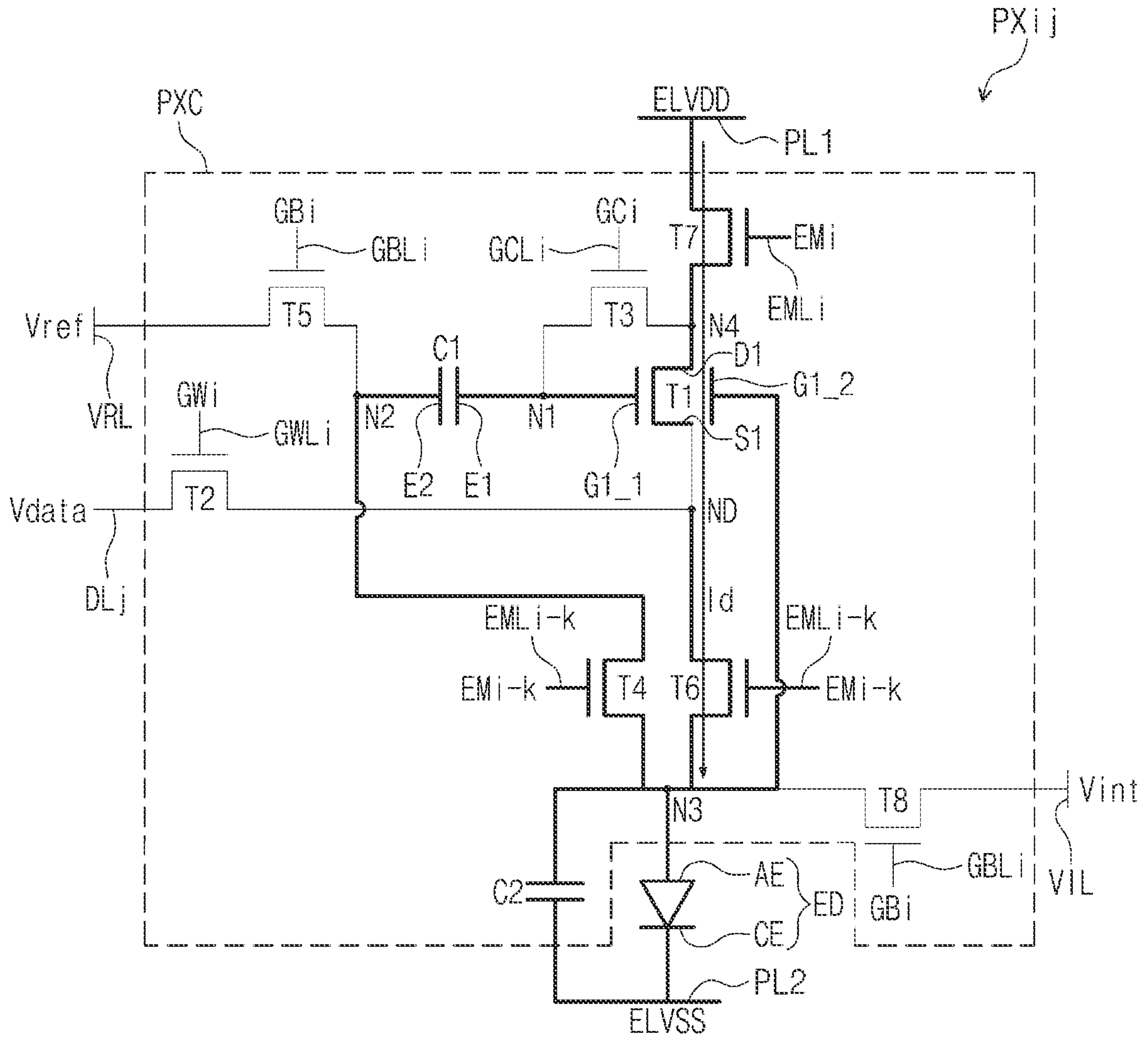

FIG. 6A is a diagram for describing an operation of the pixel PXij during the first interval P1 according to an embodiment of the present disclosure. FIGS. 6B and 6C are diagrams for describing an operation of the pixel PXij during the second interval P2 according to an embodiment of the present disclosure. FIG. 6D is a diagram for describing an operation of the pixel PXij during the third interval P3 according to an embodiment of the present disclosure. FIG. 6E is a diagram for describing an operation of the pixel PXij during the fourth interval P4 according to an embodiment of the present disclosure.

First, as shown in FIGS. 5 and 6A, the i-th emission control signal EMi, the i-th black scan signal GBi, and the i-th compensation scan signal GCi may have an active level during the first interval P1. During the first interval, the (i−k)-th emission control signal EMi−k and the i-th write scan signal GWi may have an inactive level.

During the first interval P1, the third transistor T3, the fifth transistor T5, the seventh transistor T7, and the eighth transistor T8 may be turned on. During the first interval P1, the fourth node N4 and the first node N1 may be initialized to the first driving voltage ELVDD, and the second node N2 may be initialized to the reference voltage Vref That is, during the first interval P1, the first electrode D1 of the first transistor T1, the gate electrode G1_1 of the first transistor T1, and the first capacitor electrode EL of the first capacitor C1 may be initialized to the first driving voltage ELVDD, and the second capacitor electrode E2 of the first capacitor C1 may be initialized to the reference voltage Vref.

During the first interval P1, the initialization voltage Vint may be applied to the back-gate electrode G1_2 of the first transistor T1. Also, during the first interval P1, the initialization voltage Vint may be applied to the third node N3 (that is, the anode AE of the light emitting element ED). Through this, a leakage current of the pixel PXij may be reduced to improve display quality.

Then, as shown in FIGS. 5, 6B, and 6C, the i-th write scan signal GWi may have an active level within the second interval P2. While the i-th write scan signal GWi has an active level, the second transistor T2 may be turned on. The second transistor T2 may output the data voltage Vdata corresponding to the image data signal DATA (see FIG. 2), and the data voltage Vdata may be provided to a write node ND (that is, the second electrode S1 of the first transistor T1). An interval AP_W in which the i-th write scan signal GWi has an active level (referred to as a data write interval) may overlap a part of the second interval P2. The i-th write scan signal GWi may have an active level during an initial portion of the second interval P2 and an inactive level during the remaining portion of the second interval P2.

The i-th black scan signal GBi and the i-th compensation scan signal GCi may have an active level during the second interval P2. A part of an interval AP_B in which the i-th black scan signal GBi has an active level and a part of an interval AP_C in which the i-th compensation scan signal GCi has an active level may each overlap the second interval P2. The interval AP_B in which the i-th black scan signal GBi has an active level and the interval AP_C in which the i-th compensation scan signal GCi has an active level may overlap the first interval P1 and the second interval P2, respectively. The i-th black scan signal GBi and the i-th compensation scan signal GCi may maintain the active level during the first interval P1 and the second interval P2.

The (i−k)-th emission control signal EMi−k and the i-th emission control signal EMi may have an inactive level during the second interval P2.

During the second interval P2, the first transistor T1, the third transistor T3, the fifth transistor T5, and the eighth transistor T8 may be turned on.

When the third transistor T3 is turned on, the first electrode D1 of the first transistor T1 and the gate electrode G1_1 of the first transistor T1 may be connected with each other. That is, the first transistor T1 may be diode-connected. In this case, as the data voltage Vdata is provided to the second electrode S1 of the first transistor T1 in the second interval P2, a voltage at the first node N1 may be changed into the sum of the data voltage Vdata and a threshold voltage Vth of the first transistor T1. Because a value in which the threshold voltage Vth of the first transistor T1 is compensated is directly applied to the first node N1, compensation stability may be improved.

When the fifth transistor T5 is turned on, the reference voltage Vref may be applied to the second node N2. That is, during the second interval P2, the sum of the data voltage Vdata and the threshold voltage Vth of the first transistor T1 may be provided to the first capacitor electrode EL of the first capacitor C1 and the reference voltage Vref may be applied to the second capacitor electrode E2 of the first capacitor C1. A voltage level of "(Vdata+Vth−Vref)", which is a voltage difference between the first capacitor electrode EL and the second capacitor electrode E2, may be charged in the first capacitor C1. The data voltage Vdata obtained by compensating for the threshold voltage Vth of the first transistor T1 may be charged in the first capacitor C1.

According to the present embodiment, the holding capacitor may not be included in the pixel PXij by compensating for the threshold voltage Vth of the driving transistor in a diode connection method as described above. Accordingly, an unnecessary increase in a data swing range according to the ratio of the holding capacitor to the storage capacitor may be reduced, and power consumption of the display device DD (see FIG. 1) may be reduced. In addition, a mounting space may be secured to increase design freedom or to easily implement a high-resolution pixel because a holding capacitor requiring a large area is not included.

Also, in the present embodiment, the reference voltage Vref may be provided in various voltage levels according to a setting range of the data voltage Vdata. That is, the reference voltage Vref may vary according to the setting of the data voltage Vdata. For example, the reference voltage Vref may vary in a range between the voltage level of the first driving voltage ELVDD and the voltage level of the second driving voltage ELVSS. According to the present embodiment, it is possible to set the reference voltage Vref in various ways according to the setting range of the data voltage Vdata by connecting a separate power line to one end E2 of the first capacitor C1 in which the data voltage Vdata is charged. Accordingly, compared to a case where a power voltage or an initialization voltage of the anode is applied to one end of the first capacitor, in the present embodiment, a voltage in a variety of ranges may be provided to one end E2 of the first capacitor C1, thus improving a degree of freedom in setting and adjusting the data voltage Vdata. Accordingly, the luminance of an image output from the display panel DP (see FIG. 2) may be set in various ways.

When the eighth transistor T8 is turned on, the initialization voltage Vint may be applied to the back-gate electrode G1_2 of the first transistor T1. The initialization voltage Vint may have a lower level than the data voltage Vdata. For example, when the data voltage Vdata has a voltage level of 1.5V to 6.0V, the initialization voltage Vint may have a voltage level of about −4V. During the second interval P2, the back-gate electrode G1_2 may maintain a voltage level lower than that of the second electrode S1 (that is, the source) of the first transistor T1, so that the threshold voltage Vth of the first transistor T1 may be shifted in a positive direction. Accordingly, even when the threshold voltage Vth of the first transistor T1 has a variation, stability of the diode-connection of the first transistor T1 may be improved. That is, compensation stability may be improved.

When the eighth transistor T8 is turned on, the initialization voltage Vint may be applied to the anode AE of the light emitting element ED. That is, during the second interval P2, the anode AE of the light emitting element ED may maintain the initialization voltage Vint. Through this, a leakage current of the pixel PXij may be reduced to improve display quality.

In an embodiment, after the end of the second interval P2, a time point at which the i-th black scan signal GBi is inactivated may be disposed after a time point at which the i-th compensation scan signal GCi is inactivated. That is, the i-th black scan signal GBi may be inactivated after the diode-connection of the first transistor T1 is cut off. Through this, generation of leakage current in the pixel PXij before the emission interval may be more completely blocked to improve display quality. It should be noted that the present disclosure is not limited thereto, and the time point at which the i-th black scan signal GBi is inactivated may be disposed at the same position as the time point at which the i-th compensation scan signal GCi is inactivated.

Thereafter, as shown in FIGS. 5 and 6D, during the third interval P3, the (i−k)-th emission control signal EMi−k may have an active level. During the third interval P3, the i-th emission control signal EMi, the i-th write scan signal GWi, the i-th compensation scan signal GCi, and the i-th black scan signal GBi may have an inactive level.

During the third interval P3, the fourth transistor T4 and the sixth transistor T6 may be turned on. Accordingly, the second capacitor electrode E2 of the first capacitor C1 and the second electrode S1 of the first transistor T1 may be electrically connected to each other. The reference voltage Vref in the second capacitor electrode E2 of the first capacitor C1 may be provided to the third node N3 via the fourth transistor T4 and provided to the second electrode S1 of the first transistor T1 via the sixth transistor T6. That is, the reference voltage Vref may be applied to the second electrode S1 of the first transistor T1. That is, during the third interval P3, the second electrode S1 (that is, the source) of the first transistor T1 may be initialized.

Thereafter, as shown in FIGS. 5 and 6E, during the fourth interval P4, the i-th emission control signal EMi and the (i−k)-th emission control signal EMi−k may have an active level. During the fourth interval P4, the i-th write scan signal GWi, the i-th compensation scan signal GCi, and the i-th black scan signal GBi may have an inactive level.

During the fourth interval P4, the first transistor T1, the fourth transistor T4, the sixth transistor T6, and the seventh transistor T7 may be turned on. Accordingly, a current path may be formed between the first power line PL1 and the light emitting element ED. As shown in equations below, a current Id from which the influence of the threshold voltage Vth of the first transistor T1 has been removed may flow through the current path.

$$Id = \frac{1}{2}\cdot\mu\cdot Cox\cdot\frac{W}{L}(Vgs - Vth)^2 \quad \text{[Equation 1]}$$

$$Vgs = [(Vdata + Vth) - (Vref)] \quad \text{[Equation 2]}$$

$$Id = \frac{1}{2}\cdot\mu\cdot Cox\cdot\frac{W}{L}(Vdata - Vref)^2 \quad \text{[Equation 3]}$$

In the above equations, is electron mobility and Cox is oxide capacitance per unit area which are constants, W is the channel width of the first transistor T1, L is the channel length of the first transistor T1, and Vgs is a differential voltage between the gate and source of the first transistor T1. Equation 3 may be a final result formula obtained by applying Equation 2 to Equation 1.

Referring to Equation 3, the threshold voltage Vth of the first transistor T1 may not affect a current flowing through the light emitting element ED. The threshold voltages Vth of the first transistors T1 respectively included in the pixels PX (see FIG. 2) may be different according to the characteristics of the first transistors T1. However, according to the present embodiment, a current flowing through the light emitting element ED in the fourth interval P4 may not be affected by the characteristics, for example, the threshold voltage of the first transistors T1 respectively included in the pixels PX (see FIG. 2). Therefore, according to the present disclosure, it is possible to uniformly maintain the luminance of an image output from the display panel DP (see FIG. 2), thereby providing the pixels PX (see FIG. 2) and display device DD (see FIG. 2), of which display quality is improved.

Also, the second driving voltage ELVSS in the second power line PL2 may have a variation in the voltage level due to a voltage drop (IR drop) phenomenon. However, according to the present embodiment, the reference voltage Vref may be provided to the second capacitor electrode E2 of the first capacitor C1, and the reference voltage Vref may be provided by connecting the second capacitor electrode E2 of the first capacitor C1 to the second electrode S1 of the first transistor T1, so that a fluctuation of the second driving voltage ELVSS may not affect the driving current Id flowing through the light emitting element ED. Referring to Equation 3, the driving current Id flowing through the light emitting element ED in the fourth interval P4 may not be affected by the second driving voltage ELVSS. The current flowing through the light emitting element ED may be proportional to the square of a difference between the data voltage Vdata and the reference voltage Vref regardless of the voltage value of the second driving voltage ELVSS. Accordingly, the luminance of the image IM (see FIG. 1) output from the display panel DP (see FIG. 2) may be maintained uniformly. Accordingly, the pixel PXij and the display device DD (see FIG. 1) having improved display quality may be provided.

Figure 7A:
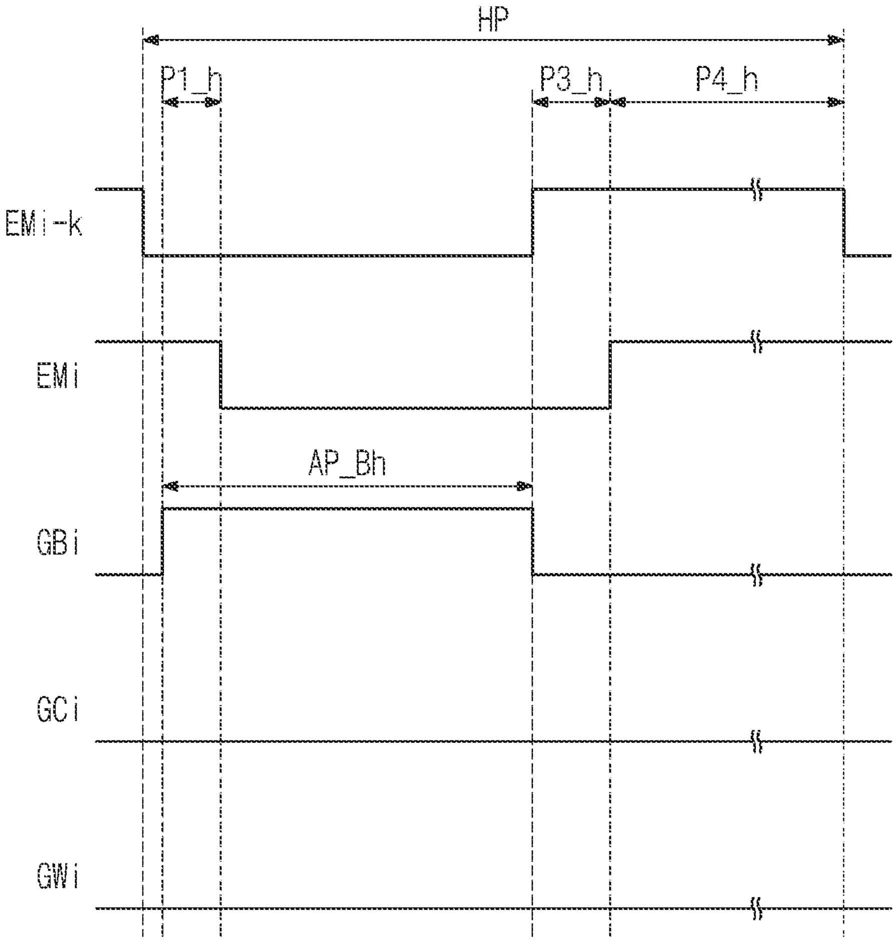
FIG. 7A is a timing diagram for describing an operation of a pixel of FIG. 4 according to an embodiment of the present disclosure.

FIG. 7A is a timing diagram for describing an operation of the pixel PXij of FIG. 4 according to an embodiment of the present disclosure. FIG. 7A illustrates, as an example, the operation of the pixel PXij during the holding frame HP in the frames F21 and F22 shown in FIG. 3B.

Referring to FIGS. 4 and 7A together, the holding frame HP may include a first interval P1_*h*, a third interval P3_*h*, and a fourth interval P4_*h*. The first interval P1_*h*, the third interval P3_*h*, and the fourth interval P4_*h* in the holding frame HP may be located at time points corresponding to the first interval P1, the third interval P3, and the fourth interval P4 in the write frame WP described above with reference to FIG. 5.

The i-th black scan signal GBi may have an active level in an interval AP_Bh in the holding frame HP. The i-th black scan signal GBi in the holding frame HP may have the same signal as the i-th black scan signal GBi in the writing frame WP. That is, the i-th black scan signal GBi may be activated at a fixed cycle even during low-frequency driving, and the anode AE of the light emitting element ED may also be initialized at a fixed cycle. Through this, it is possible to minimize a change in driving current within the holding frame HP, thus preventing a flicker phenomenon from appearing due to a luminance deviation caused by a current deviation.

Each of the (i−k)-th emission control signal EMi−k and the i-th emission control signal EMi in the holding frame HP may have an active level the same as the (i−k)-th emission control signal EMi−k and the i-th emission control signal EMi in the write frame WP. That is, each of the (i−k)-th emission control signal EMi−k and the i-th emission control signal EMi may be activated at a fixed cycle even during low-frequency driving.

The (i−k)-th emission control signal EMi−k may be activated during the third interval P3_h, and the reference voltage Vref may be applied to the second electrode S1 of the first transistor T1 before the fourth interval P4_*h* corresponding to the emission interval. Through this, it is possible to have Vgs in the P4-*h* interval P4_*h* in the holding frame HP may have the same voltage level as Vgs in the fourth interval P4 in the writing frame WP (see FIG. 5), and minimize a change in driving current in the holding frame HP.

The (i−k)-th emission control signal EMi−k and the i-th emission control signal EMi may be activated during the fourth interval P4_*h* in the holding frame HP so that the fourth interval P4_*h* in the holding frame HP may be driven in the same way as the fourth interval P4 (see FIG. 5) in the write frame WP (see FIG. 5).

Each of the i-th compensation scan signal GCi and the i-th write scan signal GWi may have an inactive level within the holding frame HP. The i-th compensation scan signal GCi maintains the inactive level during the holding frame HP and therefore, the first transistor T1 may not be diode-connected, and a separate voltage may not be provided to the gate electrode G1_1 of the first transistor T1. Because a voltage is not provided to the first capacitor electrode EL of the first capacitor C1, a differential voltage stored in the first capacitor C1 corresponding to the image data signal DATA (see FIG. 2) during the write frame WP (see FIG. 5) may be maintained constant even within the holding frame HP.

As each of the i-th compensation scan signal GCi and the i-th write scan signal GWi maintains an inactive level during the holding frame HP, the compensation for the threshold voltage of the first transistor T1 and the data writing to the writing node ND during the holding frame HP may be omitted.

Figure 7B:
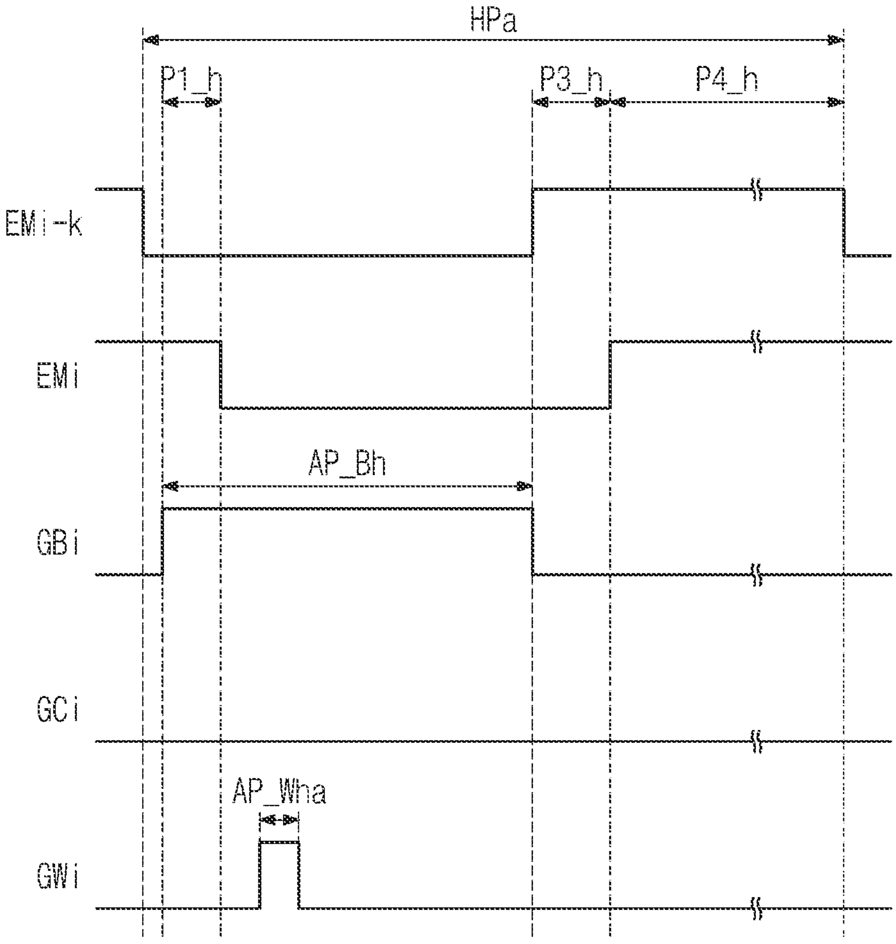
FIG. 7B is a timing diagram for describing an operation of a pixel of FIG. 4 according to an embodiment of the present disclosure.

FIG. 7B is a timing diagram for describing an operation of the pixel PXij of FIG. 4 according to an embodiment of the present disclosure. FIG. 7B illustrates, as an example, the operation of the pixel PXij during the holding frame HP in the frames F21 and F22 shown in FIG. 3B. Components which are the same as the components illustrated in FIG. 7A from among components illustrated in FIG. 7B are marked by the same reference signs, and thus, additional description will be omitted to avoid redundancy.

Referring to FIGS. 4 and 7B together, the i-th write scan signal GWi in a holding frame HPa may have the same voltage level as that of the i-th write scan signal GWi in the write frame WP (see FIG. 5). That is, the i-th black scan signal GBi may be activated at a fixed cycle even during low-frequency driving.

As the i-th compensation scan signal GCi maintains an inactive level during the holding frame HPa, the first transistor T1 may not be diode-connected. Through this, even when the data voltage Vdata corresponding to the data signal DATA (see FIG. 2) is provided to the second electrode S1 of the first transistor T1, a voltage may not be provided to the gate electrode G1_1 of the first transistor T1. Therefore, even when the i-th write scan signal GWi has an active level in the holding frame HPa, the differential voltage stored in the first capacitor C1 corresponding to the image data signal DATA (see FIG. 2) during the write frame WP (see FIG. 5) may be maintained constant even within the holding frame HPa.

Figure 8:
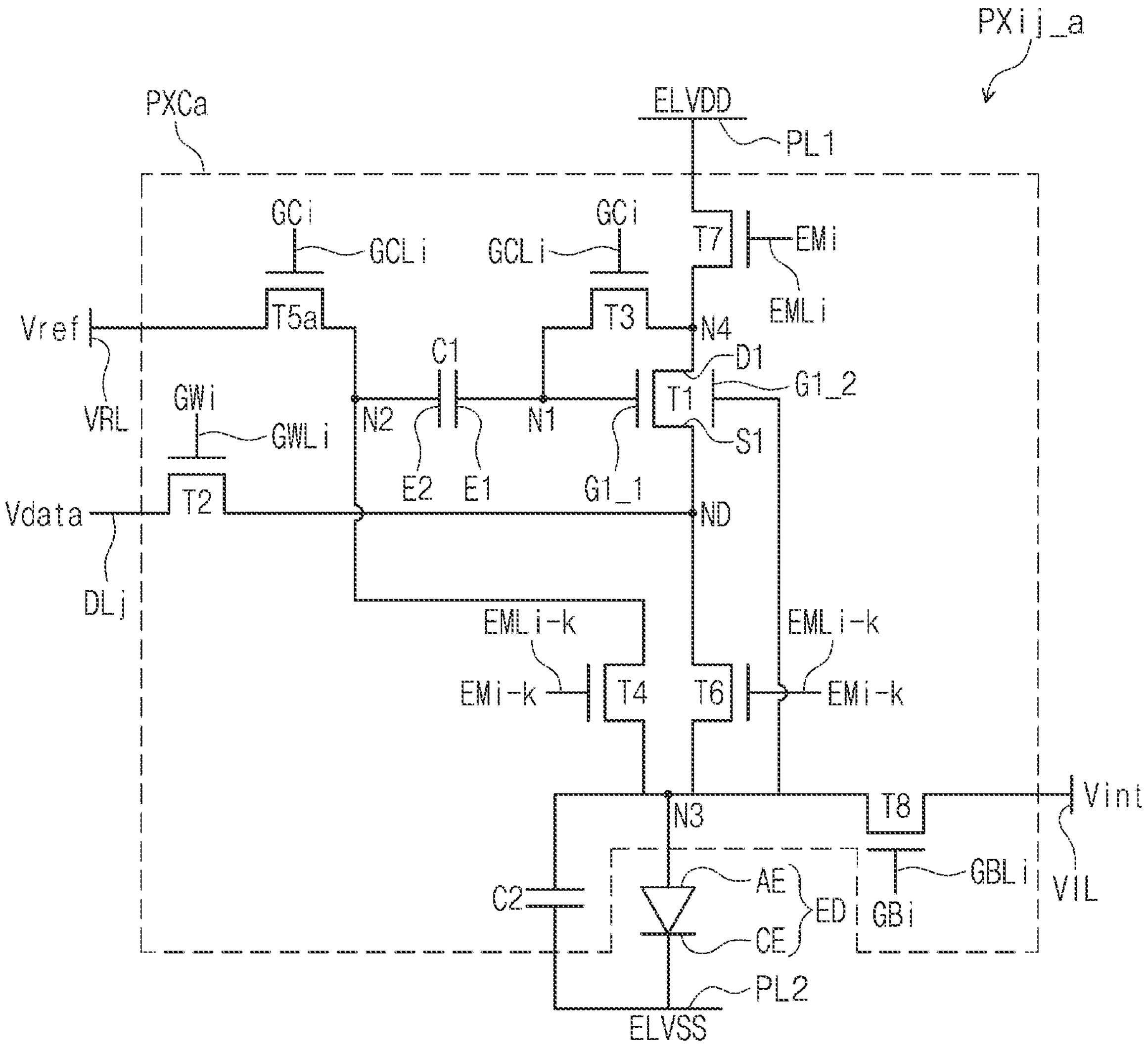
FIG. 8 is an equivalent circuit diagram of a pixel, according to an embodiment of the present disclosure.

FIG. 8 is an equivalent circuit diagram of a pixel PXij_a according to an embodiment of the present disclosure. Components which are the same as the components illustrated in FIG. 4 from among components illustrated in FIG. 8 are marked by the same reference signs, and thus, additional description will be omitted to avoid redundancy.

Referring to FIG. 8, the pixel PXij_a according to an embodiment of the present disclosure may include a pixel circuit PXCa and the light emitting element ED. In the present embodiment, the pixel circuit PXCa may include eight transistors T1 to T4, T5*a*, and T6 to T8, and two capacitors C1 and C2.

In the present embodiment, the fifth transistor T5*a* may receive the i-th compensation scan signal GCi. That is, the fifth transistor T5*a* may receive the same scan signal as the third transistor T3. A gate electrode of the fifth transistor T5*a* may be connected to the i-th compensation scan line GCLi. The fifth transistor T5*a* may be activated during the first interval P1 (see FIG. 5) and the second interval P2 (see FIG. 5) in the write frame WP (see FIG. 5). The fifth transistor T5*a* may be inactivated in the holding frame HP (see FIG. 7).

According to the present embodiment, the fifth transistor T5*a* may receive the same scan signal as the third transistor T3. Accordingly, even though a separate scan line outputting a separate scan signal is not connected to the fifth transistor T5*a*, the fifth transistor T5*a* may be turned on through the i-th compensation scan signal GCi for controlling the third transistor T3. That is, a separate scan line for turning on the fifth transistor T5*a* may be omitted. Through this, the area of the non-display area NDA (see FIG. 1) may be reduced and a distance between wires connected to the pixel PXij_a may be increased, thus reducing signal interference between wires.

Figure 9A:
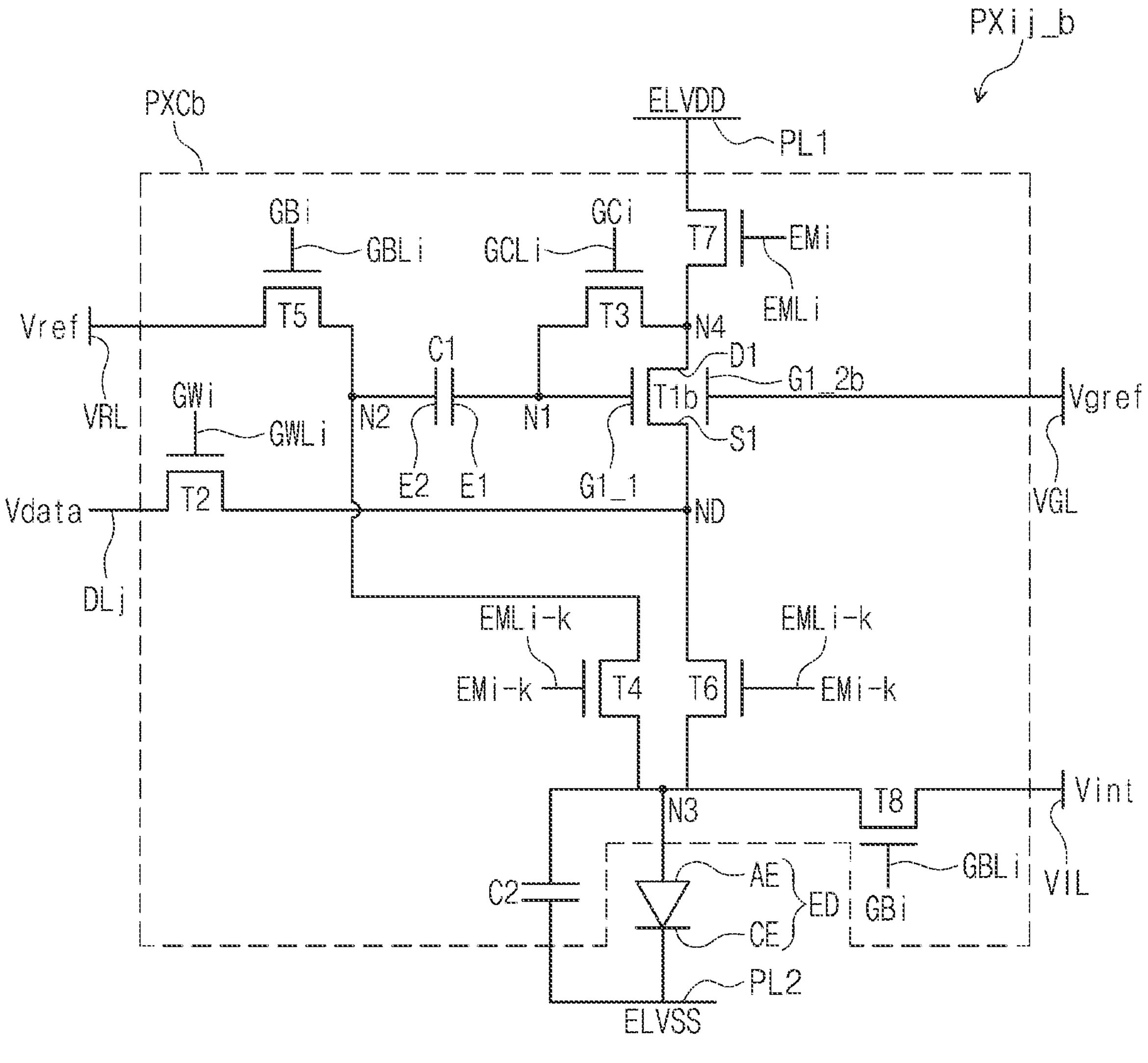
FIGS. 9A and 9B are equivalent circuit diagrams of a pixel, according to an embodiment of the present disclosure.
Figure 9B:
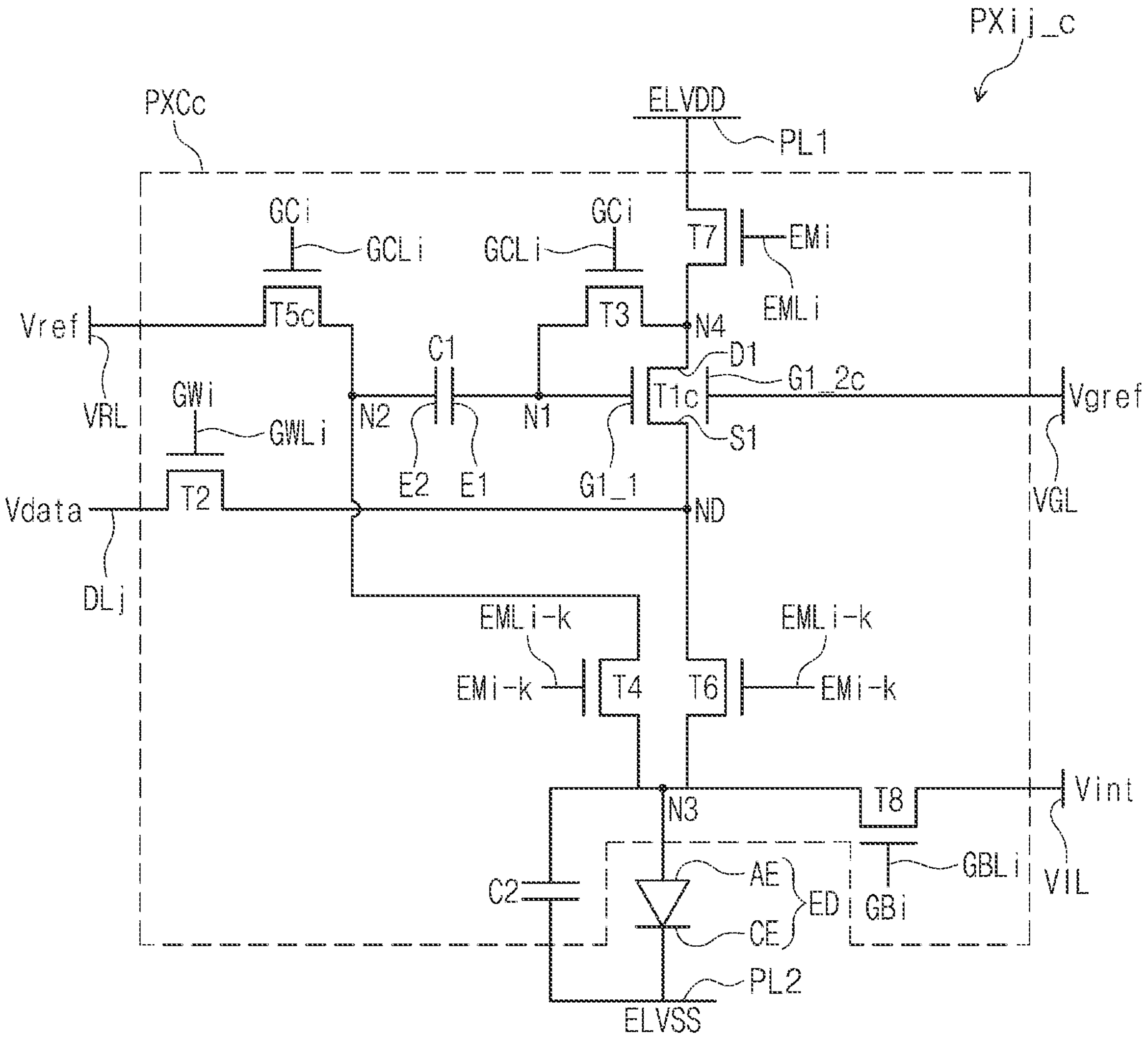

FIGS. 9A and 9B are equivalent circuit diagrams of pixels PXij_b and PXij_c according to an embodiment of the present disclosure. The same reference signs are given to the same components as the components illustrated in FIG. 4 from among components illustrated in FIGS. 9A and 9B, and thus, additional description will be omitted to avoid redundancy.

Referring to FIG. 9A, the pixel PXij_b according to an embodiment of the present disclosure may include a pixel circuit PXCb and the light emitting element ED. In the present embodiment, the pixel circuit PXCb may include eight transistors T1*b* and T2 to T8 and two capacitors C1 and C2.

In the present embodiment, the display panel DP (see FIG. 2) may further include an additional reference voltage line VGL for providing a back-gate reference voltage Vgref. A back-gate electrode G1_2*b* of the first transistor T1*b* may be connected to the additional reference voltage line VGL, and therefore, the back-gate reference voltage Vgref may be provided to the back-gate electrode G1_2*b* of the first transistor T1*b*. That is, in the present embodiment, a separate voltage line may be connected to the back-gate electrode G1_2*b* of the first transistor T1*b*.

The back-gate reference voltage Vgref may have a lower level than the data voltage Vdata. For example, when the data voltage Vdata has a voltage level of 1.5V to 6.0V, the back-gate reference voltage Vgref may have a voltage level of about −8V. During the second interval P2 (see FIG. 5), the back-gate electrode G1_2*b* may maintain a voltage level lower than that of the second electrode S1 (that is, the source) of the first transistor T1*b*, so that the threshold voltage Vth of the first transistor T1*b* may be shifted in a positive direction. Accordingly, even when the threshold voltage Vth of the first transistor T1*b* has a variation, stability of the diode-connection of the first transistor T1*b* may be improved. That is, compensation stability may be improved.

Referring to FIG. 9B, the pixel PXij_c according to an embodiment of the present disclosure may include a pixel circuit PXCc and the light emitting element ED. In the present embodiment, the pixel circuit PXCc may include eight transistors Tic, T2 to T4, T5*c*, and T6 to T8, and two capacitors C1 and C2.

According to the present embodiment, a back-gate electrode G1_2*c* of the first transistor T1*c* may be connected to the additional reference voltage line VGL and therefore, the back-gate reference voltage Vgref may be provided to the back-gate electrode G1_2*c* of the first transistor Tic. As the same description as that of the first transistor T1*b* described with reference to FIG. 9A may be applied to the first transistor T1*c* according to the present embodiment, a detailed description thereof will be omitted.

According to the present embodiment, the fifth transistor T5*c* may be connected to the i-th compensation scan line GCLi to receive the i-th compensation scan signal GCi. That is, the fifth transistor T5*c* may receive the same scan signal as the third transistor T3. As the same description as that of the fifth transistor T5*a* described with reference to FIG. 8 may be applied to the fifth transistor T5*c* according to the present embodiment, a detailed description thereof will be omitted.

Figure 10:
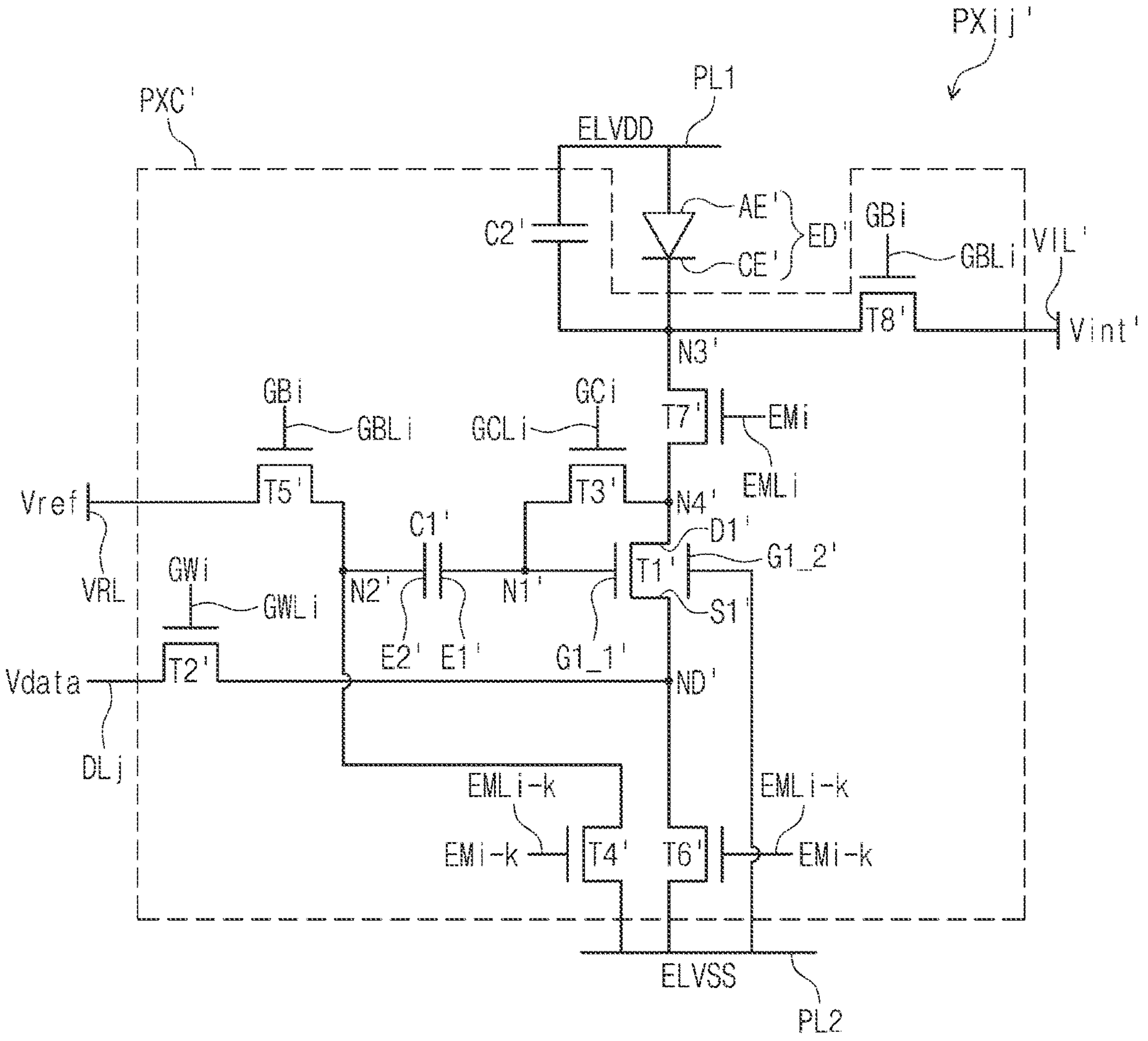
FIG. 10 is an equivalent circuit diagram of a pixel, according to an embodiment of the present disclosure.

FIG. 10 is an equivalent circuit diagram of a pixel PXij' according to an embodiment of the present disclosure. Components which are the same as the components illustrated in FIG. 4 from among components illustrated in FIG. 10 are marked by the same reference signs, and thus, additional description will be omitted to avoid redundancy.

FIG. 10 representatively illustrates the pixel PXij' connected to the i-th write scan line GWLi and connected to the j-th data line DLj. The pixel PXij' may be connected to the i-th compensation scan line GCLi, the i-th black scan line GBLi, the i-th emission control line EMLi, and the (i−k)-th emission control line EMLi−k. Here, "i" and "j" are natural numbers, and "k" is a natural number less than or equal to "i". When "k" is equal to "i", the pixel PXij' may be considered to be connected to the dummy emission control line EML0 described above with reference to FIG. 2.

The pixel PXij' may include a pixel circuit PXC' (or a pixel driving circuit) and a light emitting element ED' electrically connected to the pixel circuit PXC'. In the present embodiment, the pixel circuit PXC' may include eight transistors (hereinafter, first to eighth transistors T1' to T8') and two capacitors (hereinafter, first and second capacitors C1' and C2'). In an embodiment of the present disclosure, the pixel PXij' may not include at least one of the first to transistors T1' to T8' or may further include an additional transistor. In an embodiment of the present disclosure, the second capacitor C2' may be omitted.

The pixel PXij' may be connected to the first power line PL1 for receiving the first driving voltage ELVDD, the second power line PL2 for receiving the second driving voltage ELVSS, the reference voltage line VRL for receiving the reference voltage Vref, and an initialization voltage line VIL' for receiving an initialization voltage Vint'. The first driving voltage ELVDD may have a higher voltage level than the second driving voltage ELVSS. The initialization voltage Vint' may have a voltage level lower than the first driving voltage ELVDD and higher than the second driving voltage ELVSS.

In the present embodiment, each of the first to eighth transistors T1' to T8' may be an N-type thin film transistor having an oxide semiconductor as a semiconductor layer.

The light emitting element ED' may include an anode AE' and a cathode CE'. In the present embodiment, the anode AE' of the light emitting element ED' may be connected to the first power line PL1. The cathode CE' of the light emitting element ED' may be connected to the pixel circuit PXC'. The light emitting element ED' may emit light in response to the amount of current flowing through the first transistor T1' of the pixel circuit PXC'.

In the present embodiment, the first transistor T1' may be connected between the cathode CE' of the light emitting element ED' and the second power line PL2. The first transistor T1' may include a first electrode D1', a second electrode S1', and a gate electrode G1_1'. The gate electrode G1_1' may be connected to a first node N1', the first electrode D1' may be connected to the cathode CE' of the light emitting element ED', and the second electrode S1' may be connected to the second power line PL2. The first electrode D1' of the first transistor T1' may be connected to the cathode CE' of the light emitting element ED' via the seventh transistor T7', and the second electrode S1' of the first transistor T1' may be connected to the second power line PL2 via the sixth transistor T6'.

In the present embodiment, the first transistor T1' may further include a back-gate electrode G1_2'. The back-gate electrode G1_2' according to the present embodiment may be connected to the second power line PL2.

The second transistor T2' may be connected between the j-th data line DLj and the second electrode S1' of the first transistor T1' to receive the i-th write scan signal GWi. The second transistor T2' may transfer the data voltage Vdata received through the j-th data line DLj in response to the i-th write scan signal GWi received through the i-th write scan line GWLi to the second electrode S1' of the first transistor T1' and a write node ND' connected to the second transistor T2'.

The first capacitor C1' may be connected between the first node N1' and the second power line PL2. The first capacitor C1' may be referred to as a storage capacitor. In the present embodiment, the first capacitor C1' may include a first capacitor electrode E1' connected to the first node N1' (that is, the gate electrode G1_1' of the first transistor T1') and a second capacitor electrode E2' connected to the second power line PL2. The second capacitor electrode E2' of the first capacitor C1' may be connected to the second power line PL2 via the fourth transistor T4'.

The third transistor T3' may be connected between the first node N1' (that is, the gate electrode G1_1' of the first transistor T1') and the first electrode D1' of the first transistor T1' to receive the i-th compensation scan signal GCi. The third transistor T3' may be turned on in response to the i-th compensation scan signal GCi received through the i-th compensation scan line GCLi to electrically connect the gate electrode G1_1' of the first transistor T1' and the first electrode D1' of the first transistor T1'.

The fourth transistor T4' may be connected between a second node N2' connected to the second capacitor electrode E2' of the first capacitor C1' and the second power line PL2 to receive the (i−k)-th emission control signal EMi−k. In the present embodiment, the fourth transistor T4' may be directly connected to the second power line PL2. The fourth transistor T4' may include a first electrode connected to the second node N2', a second electrode connected to the second power line PL2, and a gate electrode connected to the (i−k)-th emission control line EMLi−k. The fourth transistor T4' may be turned on in response to the (i−k)-th emission control signal EMi-k received through the (i−k)-th emission control line EMLi−k to eclectically connect the second capacitor electrode E2' of the first capacitor C1' to the second power line PL2.

The fifth transistor T5' may be connected between the reference voltage line VRL and the second node N2' (that is, the second capacitor electrode E2' of the first capacitor C1' to receive the i-th black scan signal GBi. The fifth transistor T5' may be turned on in response to the i-th black scan signal GBi received through the i-th black scan line GBLi to provide the reference voltage Vref to the second capacitor electrode E2' of the first capacitor CF.

The sixth transistor T6' may be connected between the write node ND'(that is, the second electrode S1' of the first transistor T1') and the second power line PL2 to receive the (i−k)-th emission control signal EMi−k. In the present embodiment, the sixth transistor T6' may be directly connected to the second power line PL2. The sixth transistor T6' may include a first electrode connected to the write node ND', a second electrode connected to the second power line PL2, and a gate connected to the (i−k)-th emission control line EMLi−k. The sixth transistor T6' may be turned on in response to the (i−k)-th emission control signal EMi−k received through the (i−k)-th emission control line EMLi−k to electrically connect the second electrode S1' of the first transistor T1' to the second power line PL2.

The seventh transistor T7' may be connected between a first power line PL1' and a fourth node N4' to receive the i-th emission control signal EMi. The fourth node N4' may correspond to a node connected to the first electrode D1' of the first transistor T1' and the third transistor T3'. In the present embodiment, the seventh transistor T7' may be connected to the cathode CE' of the light emitting element ED'. The seventh transistor T7' may include a first electrode connected to the cathode CE' of the light emitting element ED', a second electrode connected to the fourth node N4', and a gate electrode connected to the i-th emission control line EMLi. The seventh transistor T7' may be turned on in response to the i-th emission control signal EMi to electrically connect the cathode CE' of the light emitting element ED' to the first electrode D1' of the first transistor T1'.

The eighth transistor T8' may be connected between the initialization voltage line VIL' and a third node N3' to receive the i-th black scan signal GBi. In the present embodiment, the third node N3' may correspond to a node connected to the first electrode of the seventh transistor T7' and the cathode CE' of the light emitting element ED'. That is, the eighth transistor T8' may be connected between the initialization voltage line VIL' and the cathode CE' of the light emitting element ED'. The eighth transistor T8' may include a first electrode connected to the initialization voltage line VIL', a second electrode connected to the third node NY, and a gate electrode connected to the i-th black scan line GBLi. The eighth transistor T8' may be turned on in response the i-th black scan signal GBi received through the i-th black scan line GBLi to provide the initialization voltage Vint' to the cathode CE' of the light emitting element ED'.

The second capacitor C2' may be connected between the anode AE' of the light emitting element ED' and the cathode CE' of the light emitting element ED'. In the present embodiment, the second capacitor C2' may be connected between the first power line PL1 and the third node NY.

FIGS. 11A to 11E are diagrams for describing the pixel PXij' of FIG. 10 according to an embodiment of the present disclosure. In an embodiment of the present disclosure, the pixel PXij' of FIG. 10 may be operated according to the timing diagram of FIG. 5 during the write frame WP. Hereinafter, the operation of the pixel PXij' will be described in more detail with reference to FIGS. 5, 10, and 11A to 11E.

Figure 11A:
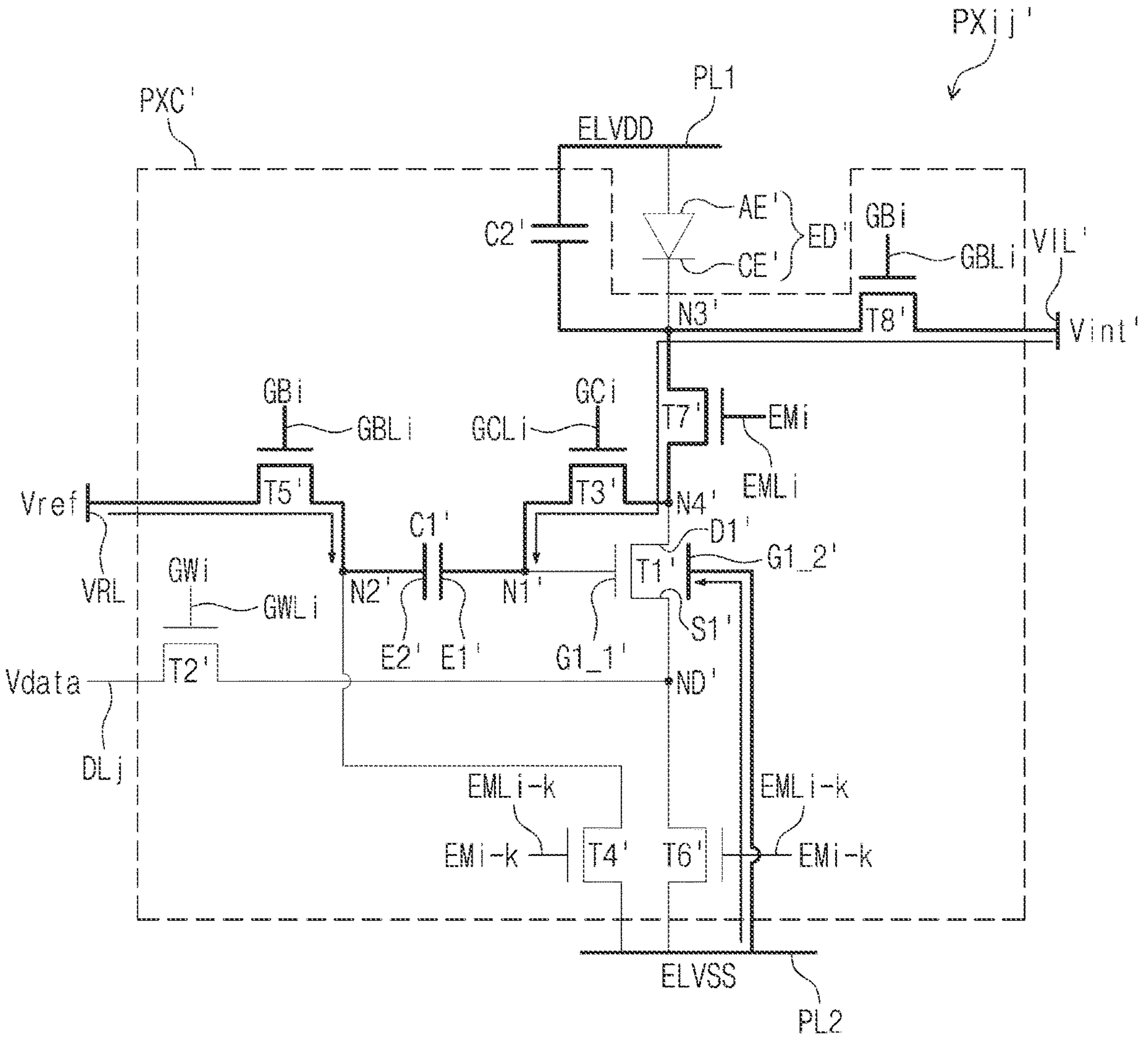
FIGS. 11A, 11B, 11C, 11D and 11E are diagrams for describing an operation of a pixel of FIG. 10 according to an embodiment of the present disclosure.
Figure 11B:
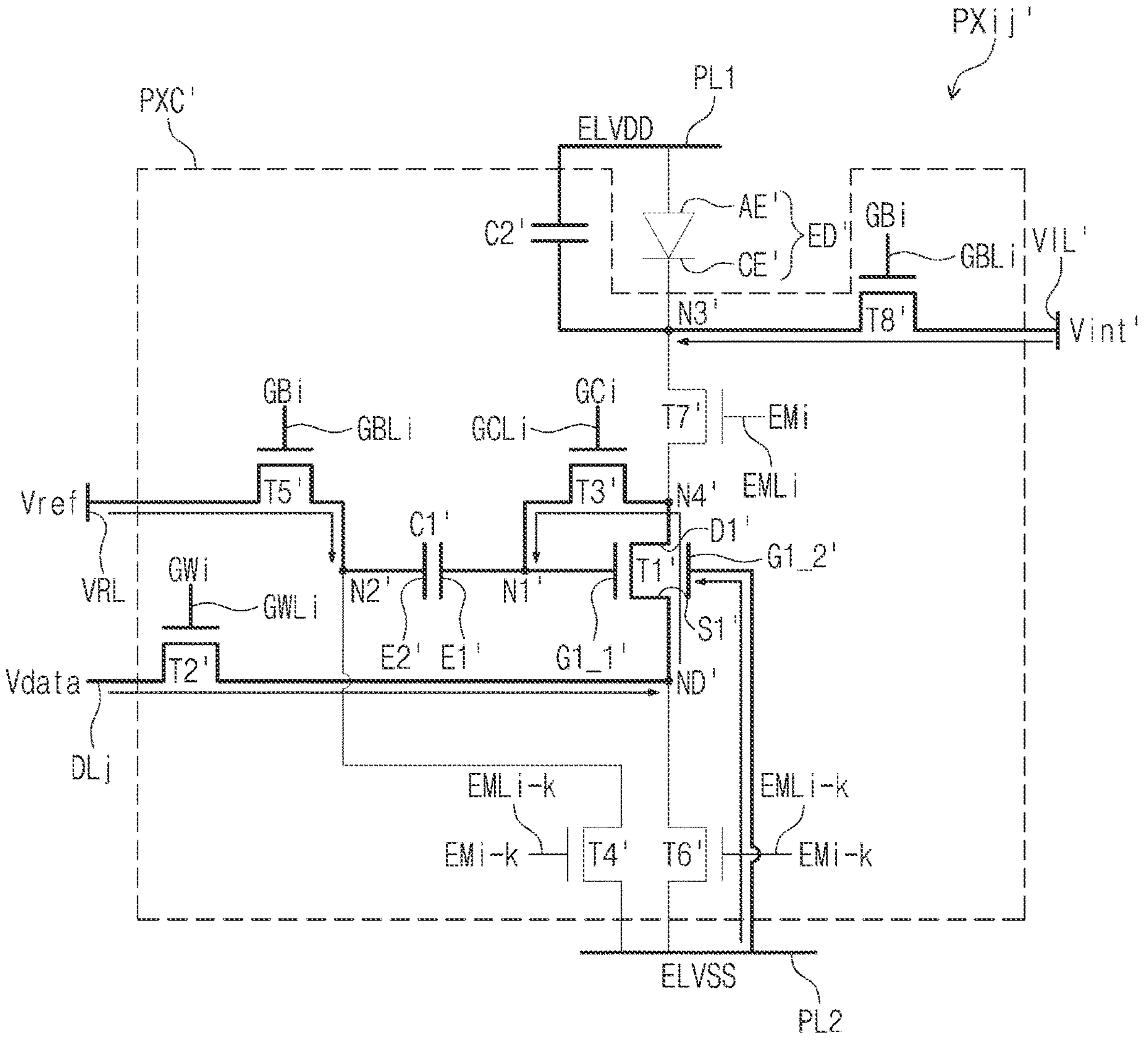
Figure 11C:
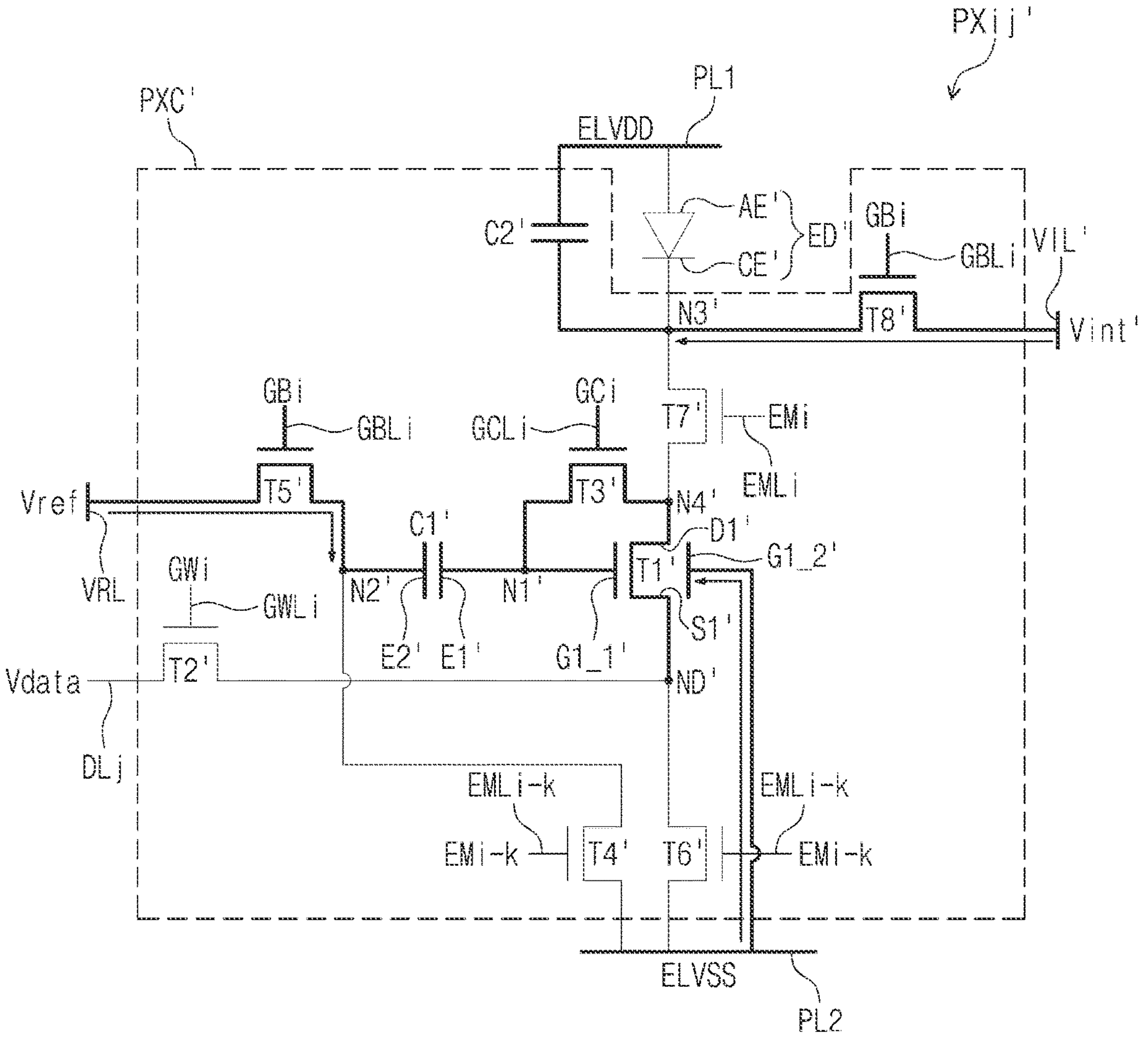
Figure 11D:
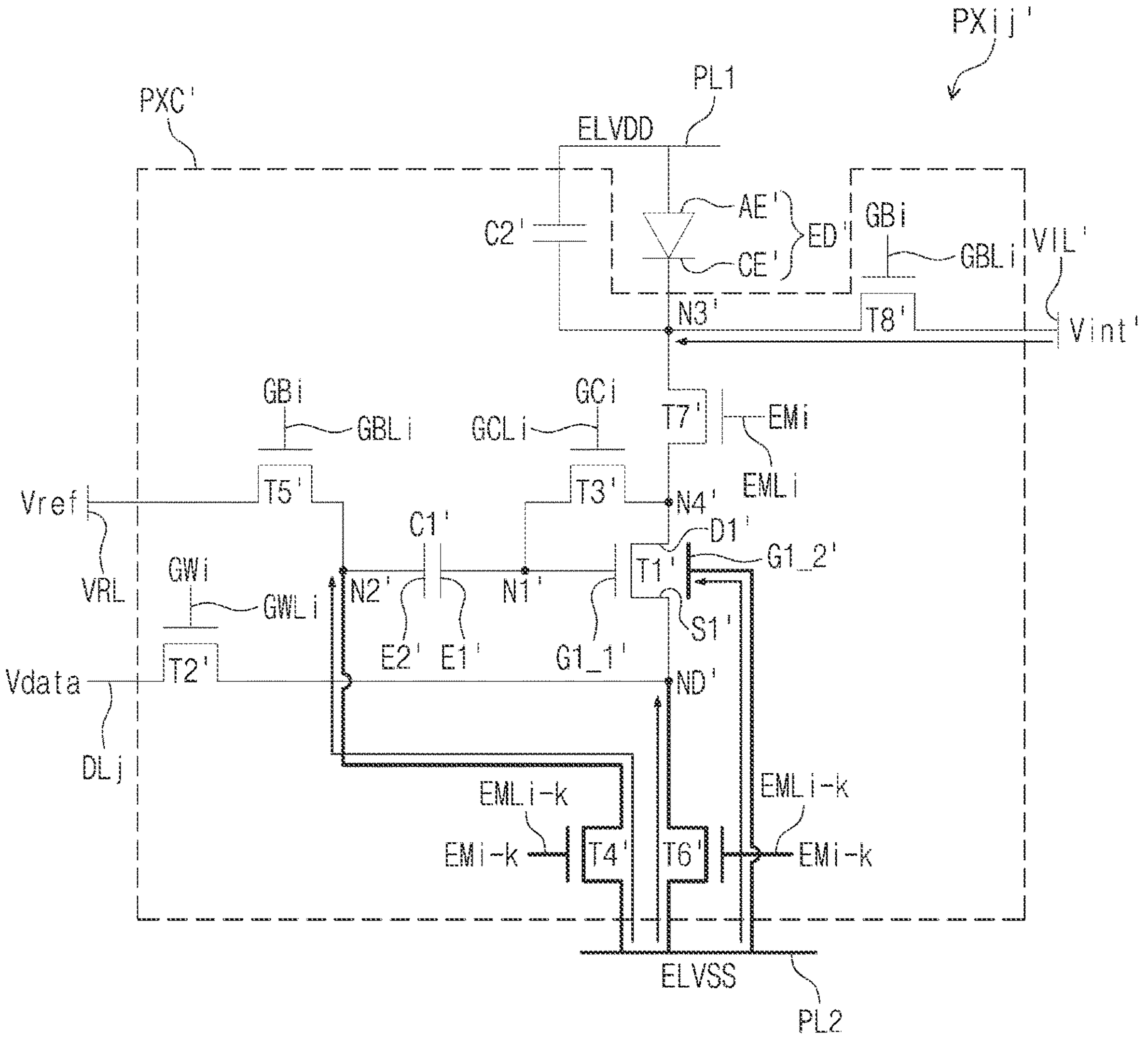
Figure 11E:
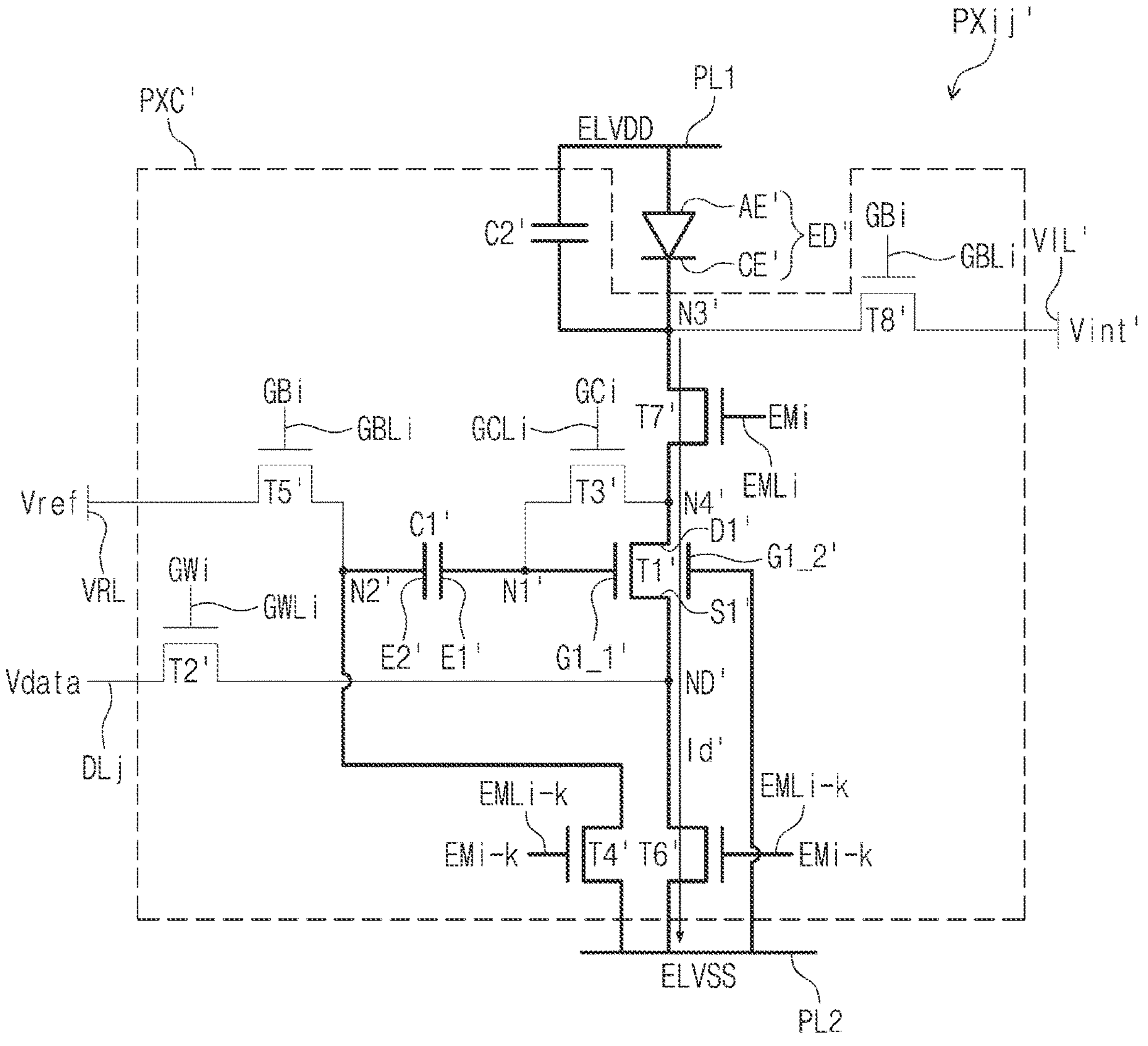

The write frame WP may include a first interval P1 (or a first initialization interval), a second interval P2 (or a compensation interval), a third interval P3 (or a second initialization interval), and a fourth interval P4 (or an emission interval). FIG. 11A is a diagram for describing an operation of the pixel PXij' during the first interval P1 according to an embodiment of the present disclosure. FIGS. 11B and 11C are diagrams for describing an operation of the pixel PXij' during the second interval P2 according to an embodiment of the present disclosure. FIG. 11D is a diagram for describing an operation of the pixel PXij' during the third interval P3 according to an embodiment of the present disclosure. FIG. 11E is a diagram for describing an operation of the pixel PXij' during the fourth interval P4 according to an embodiment of the present disclosure.

First, as shown in FIGS. 5 and 11A, during the first interval P1, the third transistor T3', the fifth transistor T5', the seventh transistor T7', and the eighth transistor T8' may be turned on. During the first interval P1, the third node NY, the fourth node N4' and the first node N1' may be initialized to the initialization voltage Vint', and the second node N2 may be initialized to the reference voltage Vref. That is, during the first interval P1, the first electrode D1' of the first transistor T1', the gate electrode G1_1' of the first transistor T1', and the first capacitor electrode E1' of the first capacitor C1' may be initialized to the initialization voltage Vint', and the second capacitor electrode E2' of the first capacitor C1' may be initialized to the reference voltage Vref.

During the first interval P1, the second driving voltage ELVSS may be provided to the back-gate electrode G1_2' of the first transistor T1'. Also, during the first interval P1, the initialization voltage Vint' may be provided to the cathode CE' of the light emitting element ED'. Through this, leakage current of the pixel PXij' may be reduced.

Thereafter, as shown in FIGS. 5 and 11B, during the interval AP_W in which the i-th write scan signal GWi has an active level in the second interval P2 (referred to as a data write interval), the second transistor T2' may provide the data voltage Vdata to the write node ND' (or the second electrode Sit of the first transistor T1').

As shown in FIGS. 5, 11B, and 11C, during the second interval P2, the first transistor T1', the third transistor T3', the fifth transistor T5', and the eighth transistor T8' may be turned on.

When the third transistor T3' is turned on, the first electrode D1' of the first transistor T1' and the gate electrode G1_1' of the first transistor T1' may be connected to each other. That is, the first transistor T1' may be diode-connected. In this case, as the data voltage Vdata is applied to the second electrode S1' of the first transistor T1' in the second interval P2, the voltage at the first node N1' may be changed into the sum of the data voltage Vdata and the threshold voltages Vth of the first transistor T1'. Because a value in which the threshold voltage Vth of the first transistor T1' is compensated is directly applied to the first node N1', compensation stability may be improved.

When the fifth transistor T5' is turned on, the reference voltage Vref may be applied to the second node N2'. That is, during the second interval P2, the sum of the data voltage Vdata and the threshold voltage Vth of the first transistor T1' may be provided to the first capacitor electrode E1' of the first capacitor C1' and the reference voltage Vref may be provided to the second capacitor electrode E2' of the first capacitor C1'. A voltage level of "(Vdata+Vth−Vref)'", which is a voltage difference between the first capacitor electrode EL' and the second capacitor electrode E2', may be charged in the first capacitor C1'. The data voltage Vdata obtained by compensating for the threshold voltage Vth of the first transistor T1' may be charged in the first capacitor C1'.

During the second interval P2, the second driving voltage ELVSS may be provided to the back-gate electrode G1_2' of the first transistor T1'. The second driving voltage ELVSS may have a level lower than a level of the data voltage Vdata. During the second interval P2, the back-gate electrode G1_2' may maintain a lower voltage level than the second electrode S1' (that is, the source) of the first transistor T1', so that the threshold voltage of the first transistor T1' may be shifted in the positive direction. Accordingly, even when the threshold voltage Vth of the first transistor T1' has a variation, stability of the diode-connection of the first transistor T1' may be improved. That is, compensation stability may be improved.

When the eighth transistor T8' is turned on, the initialization voltage Vint' may be provided to the cathode CE' of the light emitting element ED'. That is, during the second interval P2, the cathode CE' of the light emitting element ED' may maintain the initialization voltage Vint. Through this, a leakage current of the pixel PXij' may be reduced to improve display quality.

Thereafter, as shown in FIGS. 5 and 11D, during the third interval P3, the fourth transistor T4' and the sixth transistor T6' may be turned on. Accordingly, each of the second node N2' and the write node ND' may be connected electrically to the second power line PL2. That is, the second driving voltage ELVSS may be provided to each of the second capacitor electrode E2' of the first capacitor C1' and the second electrode S1' of the first transistor T1'. That is, during the third interval P3, the second electrode S1' (that is, the source) of the first transistor T1' may be initialized.

Thereafter, as shown in FIGS. 5 and 11E, during the fourth interval P4, the first transistor T1', the fourth transistor T4', the sixth transistor T6', and the seventh transistor T7' may be turned on. Accordingly, a current path may be formed between the second power line PL2 and the light emitting element ED'. As shown in equations below, a current Id' from which the influence of the threshold voltage Vth of the first transistor T1' has been removed may flow through the current path.

$$Vg' = ELVSS - Vref + Vdata + Vth \quad \text{[Equation 4]}$$

$$Vgs' = [(ELVSS - Vref + Vdata + Vth) - (ELVSS)] \quad \text{[Equation 5]}$$

$$Id' = \frac{1}{2} \cdot \mu \cdot Cox \cdot \frac{W}{L}(Vdata - Vref)^2 \quad \text{[Equation 6]}$$

In the above equations, and Cox are constants, W is the channel width of the first transistor T1, L is the channel length of the first transistor T1, and Vgs' is a differential voltage between the gate and source of the first transistor T1'. Equation 6 may be a final result formula obtained by applying Equation 5 to Equation 1.

Referring to Equations 4 and 5, as a voltage level of "(Vdata+Vth−Vref)" may be charged in the first capacitor C1' during the second interval P2, and thereafter, the second driving voltage ELVSS is provided to the second capacitor electrode E2' of the first capacitor C1' during the third interval P3, a voltage level of the first node N1' (that is, the first electrode D1' of the first transistor T1') may be expressed by Equation 4. As the second driving voltage ELVSS is provided to the second electrode S1' of the first transistor T1' during the third interval P3, Vgs' may be expressed by Equation 5.

Referring to Equation 6, the threshold voltage Vth of the first transistor T1' may not affect a current flowing through the light emitting element ED'. The threshold voltages Vth of the first transistors T1' respectively included in the pixels PX (see FIG. 2) may be different according to the characteristics of the first transistors T1'. However, according to the present embodiment, a current flowing through the light emitting element ED in the emission interval may not be affected by regardless of the characteristics, for example, the threshold voltage of the first transistors T1' respectively included in the pixels PX (see FIG. 2'). Therefore, according to the present disclosure, it is possible to uniformly maintain the luminance of an image output from the display panel DP (see FIG. 2), thereby providing the pixels PX (see FIG. 2) and display device DD (see FIG. 2), of which display quality is improved.

Also, the second driving voltage ELVSS in the second power line PL2 may have a variation in the voltage level due to a voltage drop (IR drop) phenomenon. However, according to the present embodiment, the reference voltage Vref may be provided to the second capacitor electrode E2 of the first capacitor C1 to charge the first capacitor C1' with a voltage level in which the reference voltage Vref is compensated, and the second driving voltage ELVSS may be provided to each of the second electrode S1' of the first transistor T1' and the second capacitor electrode E2' of the first capacitor C1', so that the second driving voltage ELVSS may not affect the driving current Id' flowing through the light emitting element ED'. Accordingly, the luminance of the image IM (see FIG. 1) output from the display panel DP (see FIG. 2) may be maintained uniformly. Accordingly, the pixel PXij' and the display device DD (see FIG. 1) having improved display quality may be provided.

In an embodiment of the present disclosure, the pixel PXij' of FIG. 10 may be operated according to the timing diagram of FIG. 7A during the holding frame HP.

Referring to FIGS. 7A and 10 together, the i-th black scan signal GBi may be activated at a fixed cycle even during low-frequency driving, and the cathode CE' of the light emitting element ED' may also be initialized at a fixed cycle. Through this, it is possible to minimize a change in driving current within the holding frame HP, thus preventing a flicker phenomenon from appearing due to a luminance deviation caused by a current deviation.

The (i−k)-th emission control signal EMi−k may be activated during the third interval P3_*h*, and the second driving voltage ELVSS may be provided to the second electrode S1' of the first transistor T1' before the fourth interval P4_*h* corresponding to the emission interval. Through this, it is possible to have Vgs' during the fourth interval (P4_*h*) in the holding frame HP may have the same voltage level as Vgs' in the fourth interval P4 (see FIG. 5) in the write frame WP (see FIG. 5), and minimize a change in driving current in the holding frame HP.

The (i−k)-th emission control signal EMi−k and the i-th emission control signal EMi may be activated during the fourth interval P4_*h* in the holding period HP, so that the fourth interval P4_*h* in the holding frame HP may be driven in the same way as the fourth interval P4 (see FIG. 5) in the write frame WP (see FIG. 5).

As the i-th compensation scan signal GCi maintains an inactive level during the holding frame HP, the first transistor T1' may not be diode-connected, and the differential voltage stored in the first capacitor C1' corresponding to the image data signal DATA (see FIG. 2) during the write frame WP may be maintained constant even in the holding frame HP.

In an embodiment of the present disclosure, the i-th write scan signal GWi may maintain an inactive level during the holding frame HP, so that the data voltage Vdata may not be provided to the write node ND'.

Meanwhile, in an embodiment of the present disclosure, the pixel PXij' of FIG. 10 may be operated according to the timing diagram of FIG. 7B during the holding frame HP. Referring to FIGS. 7B and 10, the i-th write scan signal GWi may be activated at a fixed cycle even during low-frequency driving. That is, the data voltage Vdata may be provided to the write node ND' in the holding frame HP.

As the i-th compensation scan signal GCi maintains an inactive level during the holding frame HP, the first transistor T1' may not be diode-connected. Through this, even when the i-th write scan signal GWi has an active level in the holding frame HP, the differential voltage stored in the first capacitor C1 corresponding to the image data signal DATA (see FIG. 2) during the write frame WP (see FIG. 5) may be maintained constant even within the holding frame HP.

Figure 12:
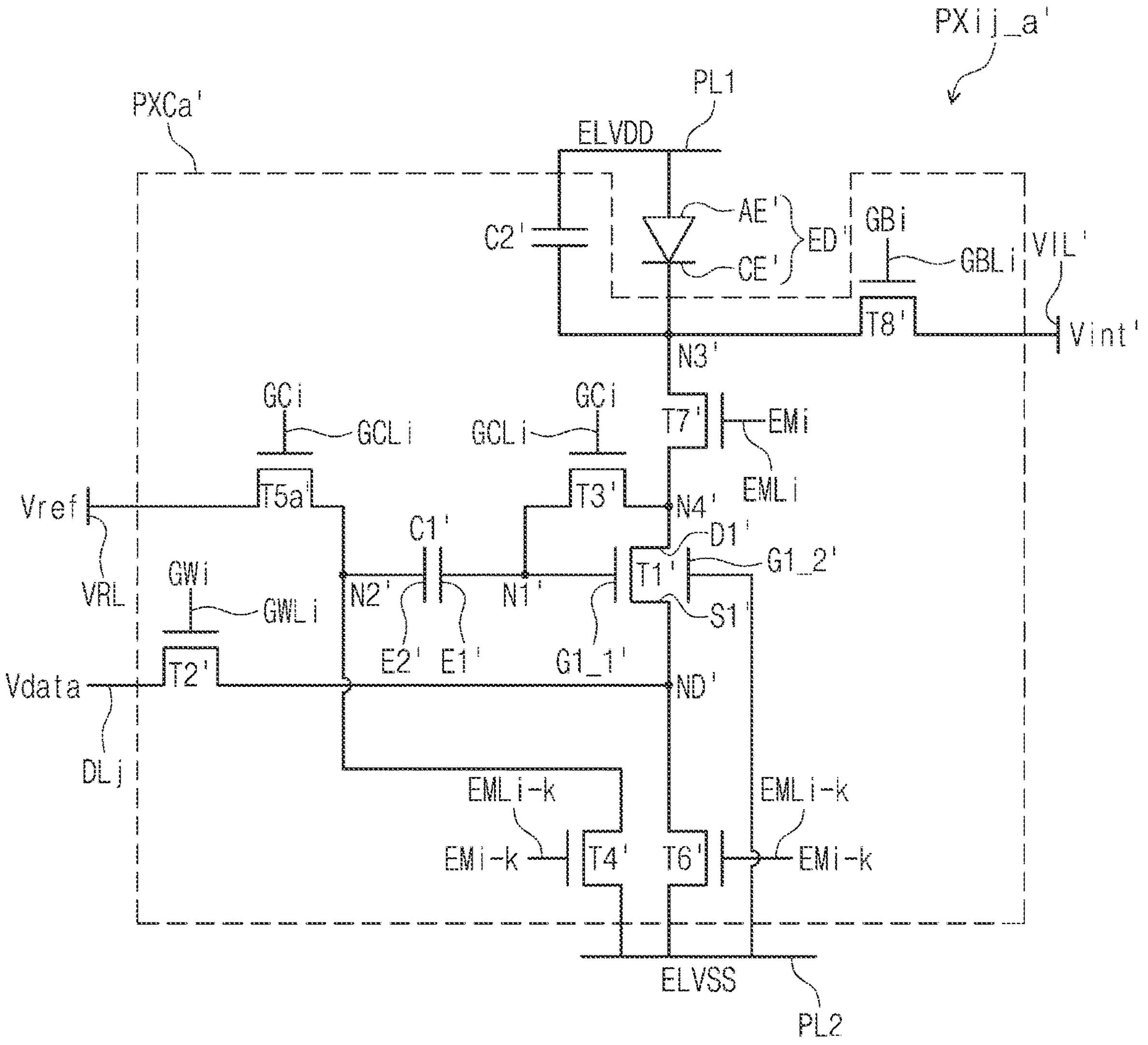
FIG. 12 is an equivalent circuit diagram of a pixel, according to an embodiment of the present disclosure.

FIG. 12 is an equivalent circuit diagram of a pixel PXij_a' according to an embodiment of the present disclosure. Components which are the same as the components illustrated in FIG. 10 from among components illustrated in FIG. 12 are marked by the same reference signs, and thus, additional description will be omitted to avoid redundancy.

Referring to FIG. 12, the pixel PXij_a' according to an embodiment of the present disclosure may include a pixel circuit PXCa' and the light emitting element ED'. In the present embodiment, the pixel circuit PXCa' may include eight transistors T1' to T4', T5*a*', and T6' to T8', and two capacitors C1' and C2'.

In the present embodiment, the fifth transistor T5*a*' may receive the i-th compensation scan signal GCi. That is, the fifth transistor T5*a*' may receive the same scan signal as the third transistor T3'. A gate electrode of the fifth transistor T5*a*' may be connected to the i-th compensation scan line GCLi. That is, a separate scan line for turning on the fifth transistor T5*a*' may be omitted. Through this, the area of the non-display area NDA (see FIG. 1') may be reduced and a distance between wires connected to the pixel PXij_a' may be increased, thus reducing signal interference between wires.

Figure 13A:
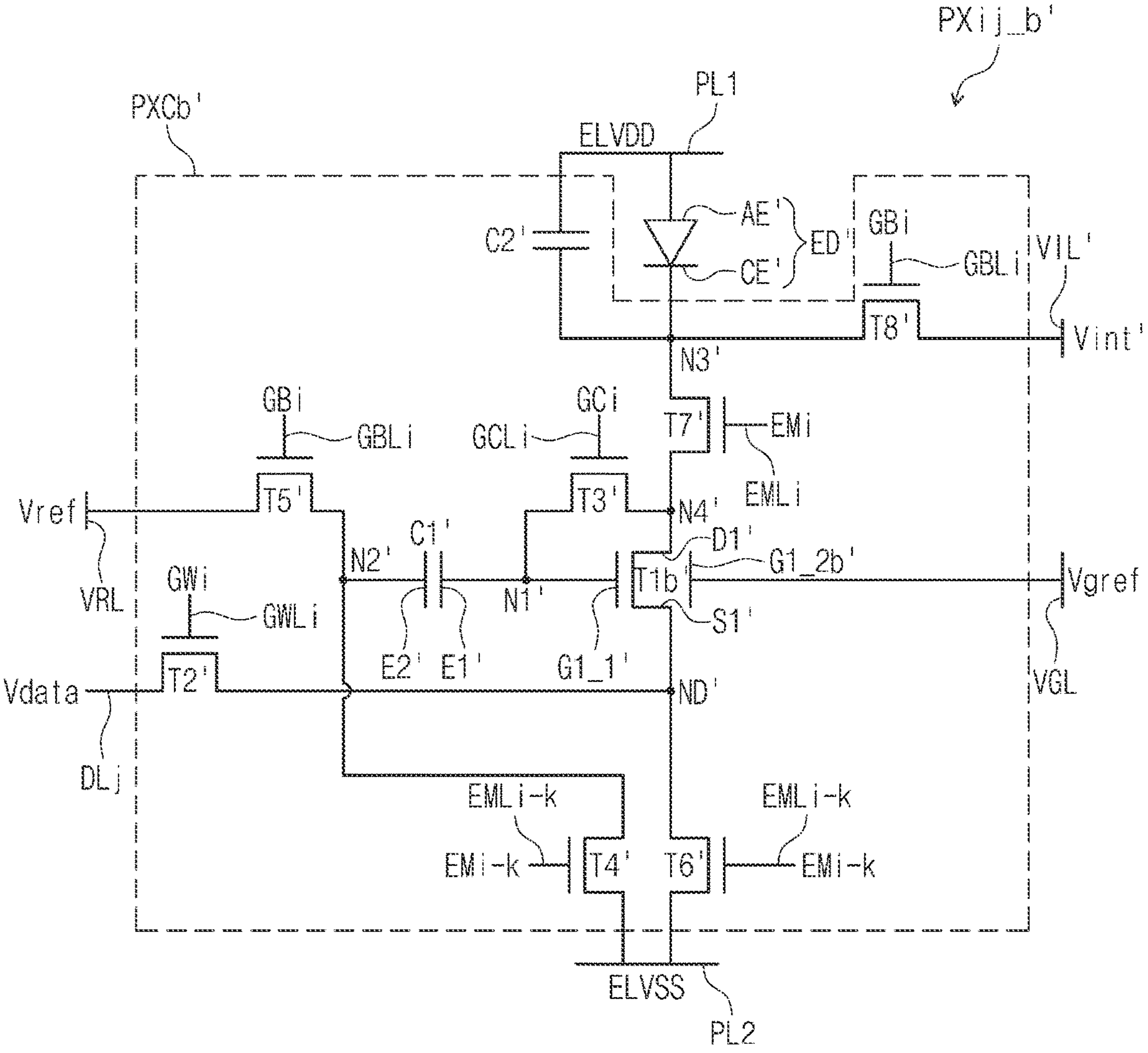
FIGS. 13A and 13B are equivalent circuit diagrams of a pixel according to an embodiment of the present disclosure.
Figure 13B:
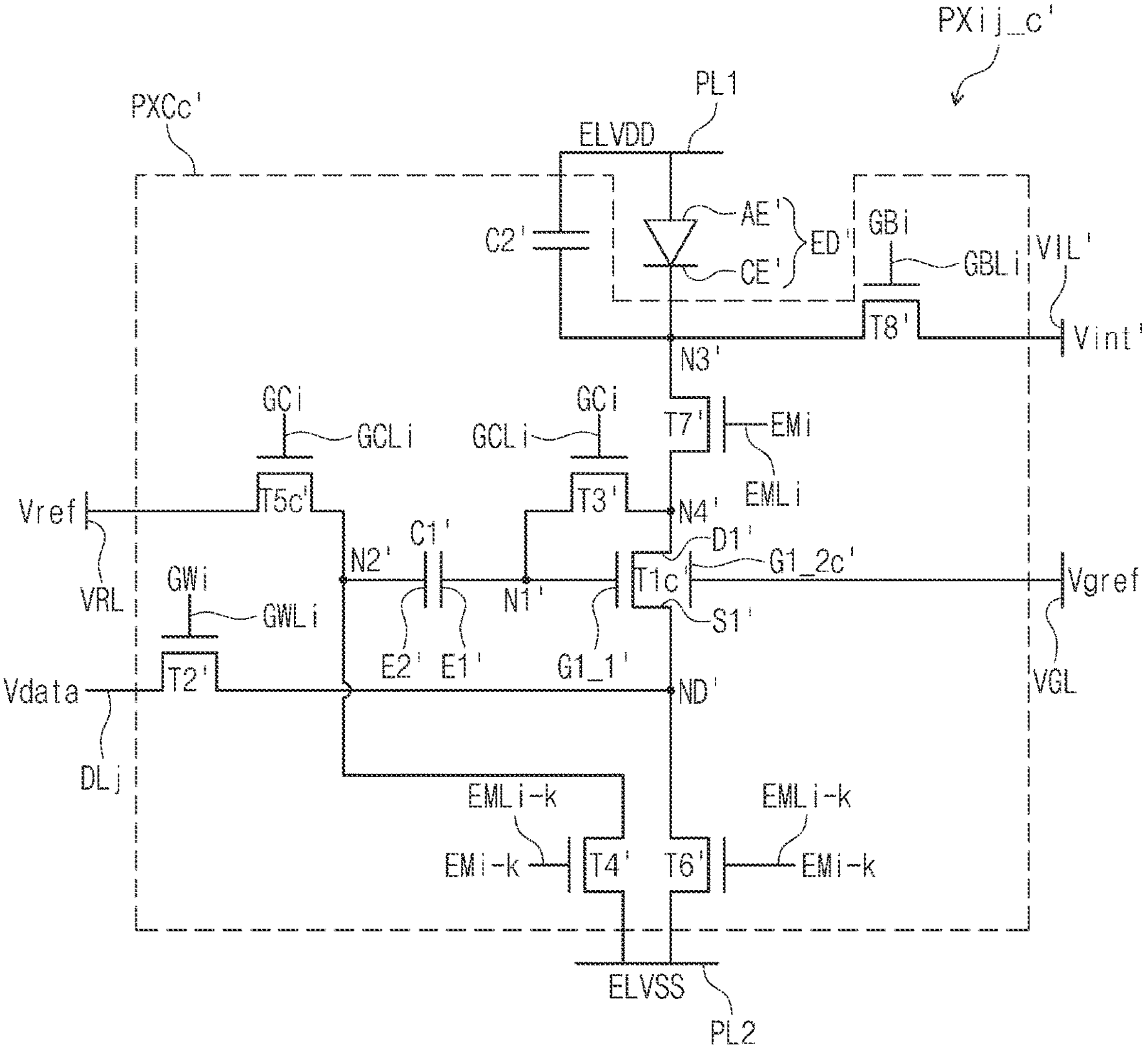

FIGS. 13A and 13B are equivalent circuit diagrams of pixels PXij_b' and PXij_c' according to an embodiment of the present disclosure. The same reference signs are given to the same components as the components illustrated in FIG. 10 from among components illustrated in FIGS. 13A and 13B, and thus, additional description will be omitted to avoid redundancy.

Referring to FIG. 13A, the pixel PXij_b' according to an embodiment of the present disclosure may include a pixel circuit PXCb' and the light emitting element ED'. In the present embodiment, the pixel circuit PXCb' may include eight transistors T1*b*' and T2' to T8' and two capacitors C1' and C2'.

In the present embodiment, the display panel DP (see FIG. 2) may further include the additional reference voltage line VGL for providing the back-gate reference voltage Vgref. A back-gate electrode G1_2*b*' of the first transistor T1*b*' may be connected to the additional reference voltage line VGL, and therefore, the back-gate reference voltage Vgref may be provided to the back-gate electrode G1_2*b*' of the first transistor T1*b*'. That is, in the present embodiment, a separate voltage line may be connected to the back-gate electrode G1_2*b*' of the first transistor T1*b*'.

The back-gate reference voltage Vgref may have a lower level than the data voltage Vdata. During the second interval P2 (see FIG. 5), the back-gate electrode G1_2*b*' may maintain a lower voltage level than the second electrode S1'(that is, the source (refer to FIG. 5) of the first transistor T1*b*', so that the threshold voltage Vth of the first transistor T1*b*' may be shifted in the positive direction. Accordingly, even when the threshold voltage Vth of the first transistor T1*b*' has a variation, stability of the diode-connection of the first transistor T1*b*' may be improved. That is, compensation stability may be improved.

Referring to FIG. 13B, a pixel PXij_c' according to an embodiment of the present disclosure may include a pixel circuit PXCc' and the light emitting element ED'. In the present embodiment, the pixel circuit PXCc' may include eight transistors T1*c*', T2' to T4', T5*c*', and T6' to T8', and two capacitors C1' and C2'.

According to the present embodiment, the back-gate electrode G1_2*c* of the first transistor T1*c*' may be connected to the additional reference voltage line VGL and therefore, the back-gate reference voltage Vgref may be provided to the back-gate electrode G1_2*c*' of the first transistor T1*c*'. As the same description as that of the first transistor T1*b*' described with reference to FIG. 13A may be applied to the first transistor T1*c*' according to the present embodiment, a detailed description thereof will be omitted.

According to the present embodiment, the fifth transistor T5*c*' may be connected to the i-th compensation scan line GCLi to receive the i-th compensation scan signal GCi. That is, the fifth transistor T5*c*' may receive the same scan signal as the third transistor T3'. As the same description as that of the fifth transistor T5*a*' described with reference to FIG. 12 may be applied to the fifth transistor T5*c*' according to the present embodiment, a detailed description thereof will be omitted.

Although described above with reference to embodiments of the present disclosure, it will be understood by those skilled in the art that various modifications and changes can be made in the present disclosure without departing from the spirit and scope of the present disclosure as set forth in the claims below. Accordingly, the technical scope of the inventive concept is not limited to the detailed description of this specification, but should be defined by the claims.

According to the present disclosure, the threshold voltage of the driving transistor may not affect the driving current flowing through the light emitting element. Accordingly, the driving current flowing through the light emitting element may not be affected by the characteristics of the driving transistor, and the luminance of an image output from the display panel may be maintained uniformly.

According to the present disclosure, the driving voltage of the driving transistor may not affect the driving current flowing through the light emitting element. Accordingly, there may be no influence due to the voltage drop in the driving voltage, and the luminance of the image output from the display panel may be maintained uniformly.

According to the present disclosure, the degree of freedom in setting and adjusting the data voltage may be improved by providing a separate reference voltage to one end of the storage capacitor. Accordingly, the luminance of the image output from the display panel may be set in various ways.

According to the present disclosure, even when the compensation voltage of the driving transistor has a variation, the stability of the diode-connection of the driving transistor may be improved. Accordingly, compensation stability may be improved.

Therefore, according to the present disclosure, it is possible to provide a pixel and a display device with improved display quality.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a light emitting element and a pixel circuit connected to the light emitting element, wherein the pixel circuit includes:

a first transistor including a gate electrode connected to a first node, a first electrode connected to a first power line, and a second electrode connected to a second power line;

a second transistor connected between the second electrode of the first transistor and a data line to receive a write scan signal;

a third transistor connected between the first node and the first electrode of the first transistor to receive a compensation scan signal which is different from the write scan signal;

a storage capacitor connected between the first node and the second power line; and a fourth transistor connected between the storage capacitor and the second power line to receive a first emission control signal, wherein the display panel displays an image in a plurality of frames, wherein the plurality of frames includes a write frame and a holding frame, wherein the write scan signal and the compensation scan signal have an active level in the write frame, and wherein the write scan signal has the active level in the holding frame, and the compensation scan signal only has an inactive level during the holding frame.

2. The display device of claim 1, wherein at least one of the plurality of frames includes a first initialization interval, a compensation interval following the first initialization interval, a second initialization interval following the compensation interval, and an emission interval following the second initialization interval, wherein the compensation scan signal has an active level and the write scan signal and the first emission control signal has an inactive level during the first initialization interval, and wherein the compensation scan signal has the active level and the first emission control signal has the inactive level during the compensation interval;

wherein the first emission control signal has an active level, and the write scan signal and the compensation scan signal have the inactive level during the second initialization interval, wherein the compensation interval includes a data write interval in which the write scan signal has an active level.

3. The display device of claim 1, wherein the pixel circuit further includes a fifth transistor connected between a second node connected to the storage capacitor and the fourth transistor, and a reference voltage line.

4. The display device of claim 3, wherein at least one of the plurality of frames includes a first initialization interval, a compensation interval following the first initialization interval, a second initialization interval following the compensation interval, and an emission interval following the second initialization interval, wherein the fifth transistor receives one of the compensation scan signal and a black scan signal, wherein the one of the compensation scan signal and the black scan signal received by the fifth transistor has an active level during the first initialization interval and the compensation interval, and has an inactive level during the second initialization interval.

5. The display device of claim 1, wherein the pixel circuit further includes a sixth transistor connected between the second electrode of the first transistor and the second power line to receive the first emission control signal.

6. The display device of claim 5, wherein the pixel circuit further includes a seventh transistor connected between the first power line and the first electrode of the first transistor to receive a second emission control signal.

7. The display device of claim 6, wherein the second emission control signal corresponds to an i-th light emission control signal that are sequentially activated, where “i” is a natural number, and wherein the first emission control signal corresponds to an (i−k)-th emission control signal that are sequentially activated, where “k” is a natural number less than or equal to “i”.

8. The display device of claim 7, wherein at least one of the plurality of frames includes a first initialization interval, a compensation interval following the first initialization interval, a second initialization interval following the compensation interval, and an emission interval following the second initialization interval, wherein the first emission control signal has an active level, and the second emission control signal has an inactive level during the second initialization interval, and wherein the first emission control signal and the second emission control signal have the active level during the emission interval.

9. The display device of claim 5, wherein the light emitting element includes:

an anode connected to a third node which is connected to the fourth transistor and the sixth transistor; and a cathode connected to the second power line.

10. The display device of claim 9, wherein the pixel circuit further includes an eighth transistor connected between the third node and an initialization voltage line to receive a black scan signal.

11. The display device of claim 10, wherein at least one of the plurality of frames includes a first initialization interval, a compensation interval following the first initialization interval, a second initialization interval following the compensation interval, and an emission interval following the second initialization interval, wherein the black scan signal has an active level during the first initialization interval and the compensation interval, and has an inactive level during the second initialization interval.

12. The display device of claim 11, wherein the compensation scan signal has an active level during the compensation interval and an inactive level during the second initialization interval, and wherein the black scan signal is inactivated after the compensation scan signal is inactivated.

13. The display device of claim 11, wherein the black scan signal has the active level in the write frame and the holding frame.

14. The display device of claim 10, wherein the pixel circuit further includes a fifth transistor connected between a second node connected to the storage capacitor and the fourth transistor, and a reference voltage line to receive the black scan signal.

15. The display device of claim 10, wherein the first transistor further includes a back-gate electrode connected to the third node which is connected to the anode of the light emitting element.

16. The display device of claim 5, wherein the light emitting element includes:

an anode connected to the first power line; and a cathode connected to the first electrode of the first transistor.

17. The display device of claim 16, wherein the pixel circuit further includes an eighth transistor connected between the cathode of the light emitting element and an initialization voltage line to receive a black scan signal.

18. The display device of claim 16, wherein the first transistor further includes a back-gate electrode connected to the second power line.

19. The display device of claim 1, wherein the first transistor further includes a back-gate electrode connected to a gate initialization voltage line.

* * * * *